US010394427B2

(12) United States Patent
Higashibeppu

(10) Patent No.: US 10,394,427 B2
(45) Date of Patent: Aug. 27, 2019

(54) INFORMATION PROCESSING DEVICE HAVING UNLOCKING FUNCTION

(75) Inventor: Satoshi Higashibeppu, Kanagawa (JP)

(73) Assignee: NEC Corporation, Tokyo (JP)

( * ) Notice: Subject to any disclaimer, the term of this patent is extended or adjusted under 35 U.S.C. 154(b) by 1077 days.

(21) Appl. No.: 14/344,811

(22) PCT Filed: Sep. 11, 2012

(86) PCT No.: PCT/JP2012/073127
§ 371 (c)(1),
(2), (4) Date: Oct. 20, 2014

(87) PCT Pub. No.: WO2013/039046
PCT Pub. Date: Mar. 21, 2013

(65) Prior Publication Data
US 2015/0040024 A1    Feb. 5, 2015

(30) Foreign Application Priority Data

Sep. 16, 2011    (JP) ................................. 2011-202862

(51) Int. Cl.
*G06F 3/048*    (2013.01)
*G06F 3/0484*    (2013.01)
(Continued)

(52) U.S. Cl.
CPC .......... *G06F 3/04842* (2013.01); *G06F 3/048* (2013.01); *G06F 3/0484* (2013.01);
(Continued)

(58) Field of Classification Search
None
See application file for complete search history.

(56) References Cited

U.S. PATENT DOCUMENTS 8,547,466 B2 * 10/2013 Chao ................... G06F 3/04883
348/333.01
8,707,175 B2 *  4/2014 Lee ..................... G06F 3/04817
715/702

(Continued)

FOREIGN PATENT DOCUMENTS

EP    2117206 A2    11/2009
EP    2144148 A2    1/2010

(Continued)

OTHER PUBLICATIONS

International Search Report corresponding to PCT/JP2012/073127, dated Dec. 18, 2012; 4 pp.

(Continued)

*Primary Examiner* — Andrey Belousov
*Assistant Examiner* — Haimei Jiang
(74) *Attorney, Agent, or Firm* — Wilmer Cutler Pickering Hale and Dorr LLP

(57) ABSTRACT

An information processing device having a touch panel includes an operation part, a display, an operation content determination part, and a display control part. The operation part displays an unlock icon while the display displays the predetermined lock screen in the locked state. The operation content determination part determines whether or not to release the locked state and whether to change the display content of the lock screen in response to a user's operation on the unlock icon. The display control part changes the display content of the lock screen based on the determination result. The unlock icon can be moved from the initial position to an end mark along a slide bar via a user's operation. The operation content determination part determines the instructed content of a user's operation based on the time length of a user's operation on the unlock icon or the position of the unlock icon.

13 Claims, 19 Drawing Sheets

(51) Int. Cl.
*G06F 3/0488* (2013.01)
*G06F 3/0481* (2013.01)

(52) U.S. Cl.
CPC ........ *G06F 3/0488* (2013.01); *G06F 3/04817* (2013.01); *G06F 3/04847* (2013.01); *G06F 3/04883* (2013.01)

(56) References Cited

U.S. PATENT DOCUMENTS

| | | | | |
|---|---|---|---|---|
| 8,737,966 | B2* | 5/2014 | Lee | G06F 3/0488 455/410 |
| 8,837,901 | B2* | 9/2014 | Shekarri | G01P 1/127 386/224 |
| 2004/0088568 | A1 | 5/2004 | Tokkonen | |
| 2007/0213906 | A1* | 9/2007 | Montgomery | A01B 63/00 701/50 |
| 2008/0082919 | A1* | 4/2008 | Kojima | H04N 1/00442 715/700 |
| 2009/0006991 | A1 | 1/2009 | Lindberg et al. | |
| 2009/0043448 | A1* | 2/2009 | Boger | B60K 37/06 701/36 |
| 2009/0083847 | A1 | 3/2009 | Fadell et al. | |
| 2009/0083850 | A1 | 3/2009 | Fadell et al. | |
| 2009/0280872 | A1 | 11/2009 | Kajiya et al. | |
| 2010/0001967 | A1* | 1/2010 | Yoo | G06F 3/0488 345/173 |
| 2010/0020035 | A1* | 1/2010 | Ryu | G06F 3/04883 345/173 |
| 2010/0159995 | A1 | 6/2010 | Stallings et al. | |
| 2010/0248689 | A1 | 9/2010 | Teng et al. | |
| 2010/0269040 | A1 | 10/2010 | Lee | |
| 2010/0306693 | A1* | 12/2010 | Brinda | G06F 3/04883 715/784 |
| 2011/0041102 | A1* | 2/2011 | Kim | G06F 3/04883 715/863 |
| 2011/0072400 | A1* | 3/2011 | Watanabe | G06F 3/0488 715/863 |
| 2011/0161889 | A1* | 6/2011 | Scheer | G06F 3/04815 715/863 |
| 2012/0053887 | A1* | 3/2012 | Nurmi | G06F 3/0485 702/150 |
| 2012/0124512 | A1 | 5/2012 | Lindberg et al. | |
| 2013/0239045 | A1 | 9/2013 | Lindberg et al. | |
| 2013/0239065 | A1 | 9/2013 | Lindberg et al. | |
| 2013/0246971 | A1 | 9/2013 | Lindberg et al. | |
| 2014/0066131 | A1 | 3/2014 | Yoo | |
| 2015/0020030 | A1 | 1/2015 | Yoo | |

FOREIGN PATENT DOCUMENTS

| | | |
|---|---|---|
| JP | 06-035858 | 2/1994 |
| JP | 2000-181597 | 6/2000 |
| JP | 2001-216439 | 8/2001 |
| JP | 2005-004389 | 1/2005 |
| JP | 2008-210395 | 9/2008 |
| JP | 2010-541046 | 12/2010 |
| WO | WO-2009/042392 | 4/2009 |
| WO | WO-2010/117642 | 10/2010 |

OTHER PUBLICATIONS

Extended European Search Report corresponding to European Application No. 12832346.6, dated Jul. 7, 2015, 12 pages.

* cited by examiner

FIG. 3

DISPLAY APPLICATION STARTING INFORMATION (134)

| APPLICATION ID | TITLE | DISPLAY FLAG |
|---|---|---|
| A000 | NON-DISPLAY | 0 |
| A001 | MAGNETIC BEARING | 1 |
| A002 | CLOCK | 0 |
| A003 | CALENDAR | 0 |
| A004 | NEWS | 0 |
| A005 | BAROMETER | 0 |
| A006 | THERMOMETER | 0 |
| ... | ... | ... |

FIG. 5
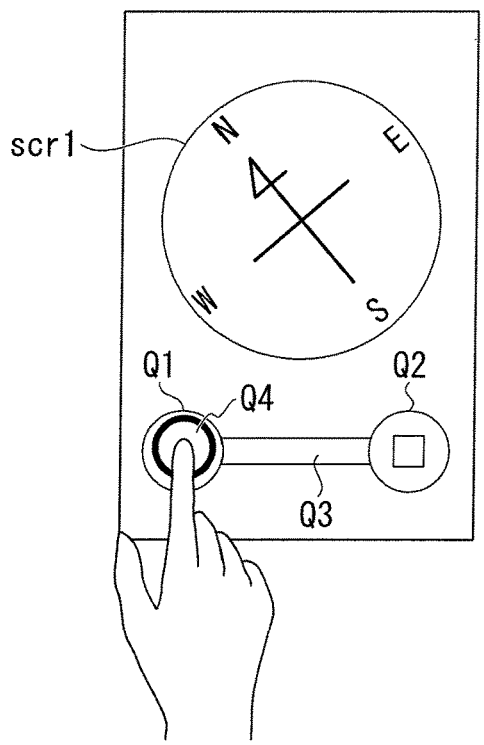
(a)
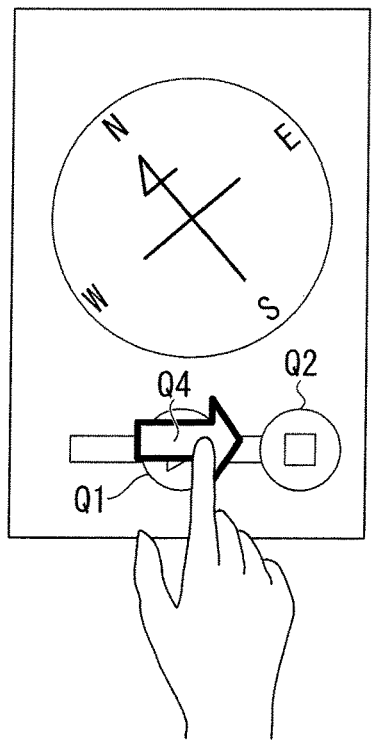
(b)
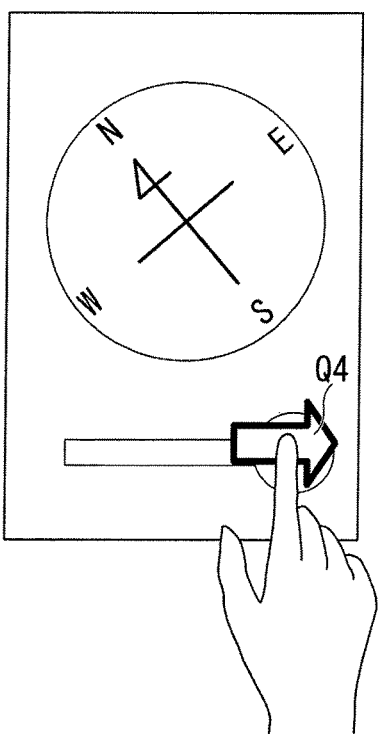
(c)
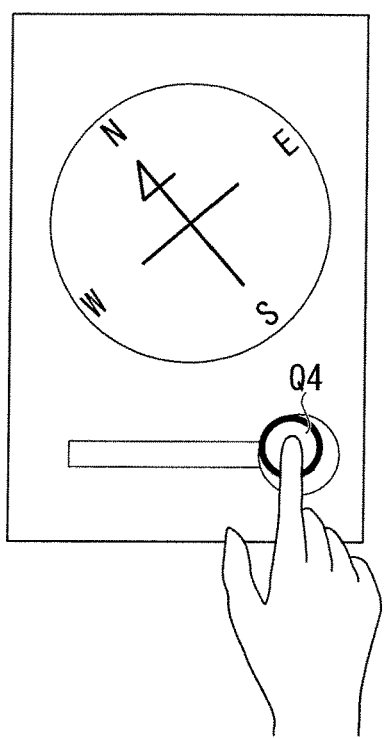
(d)

FIG. 6
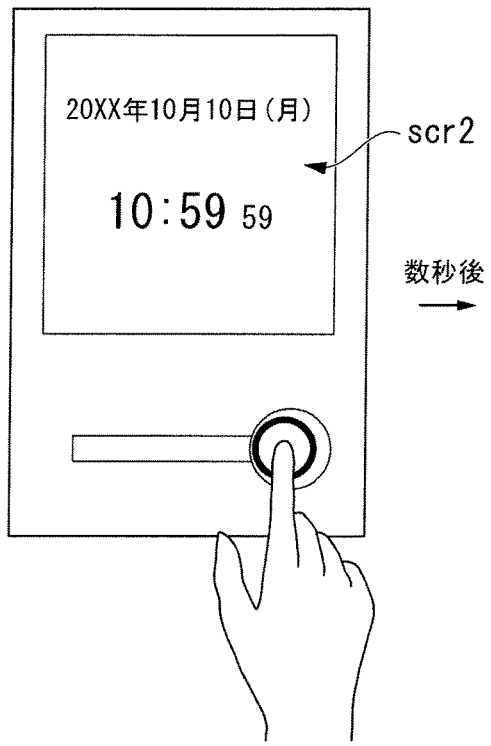
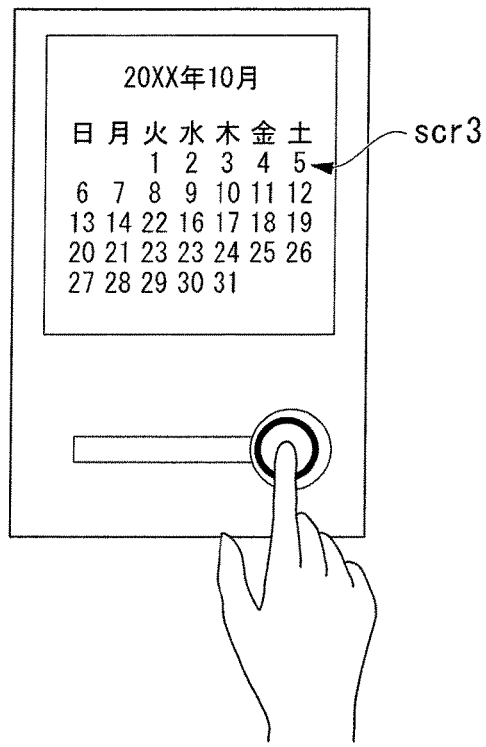
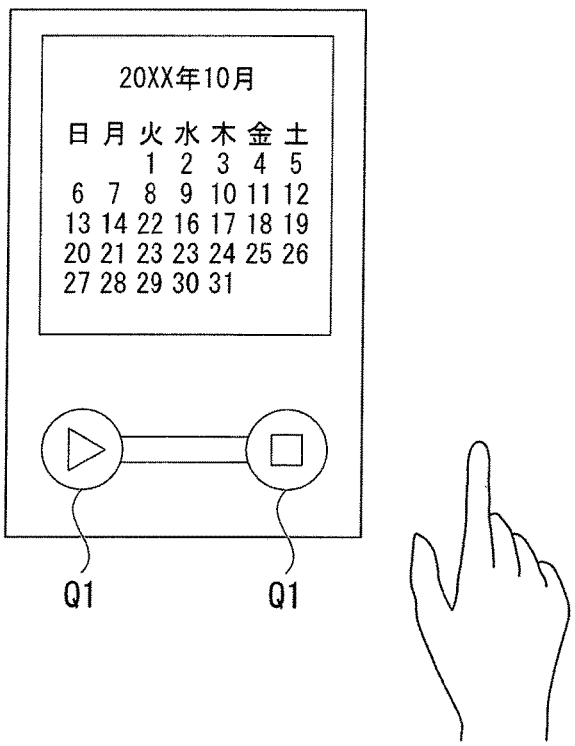

FIG. 14
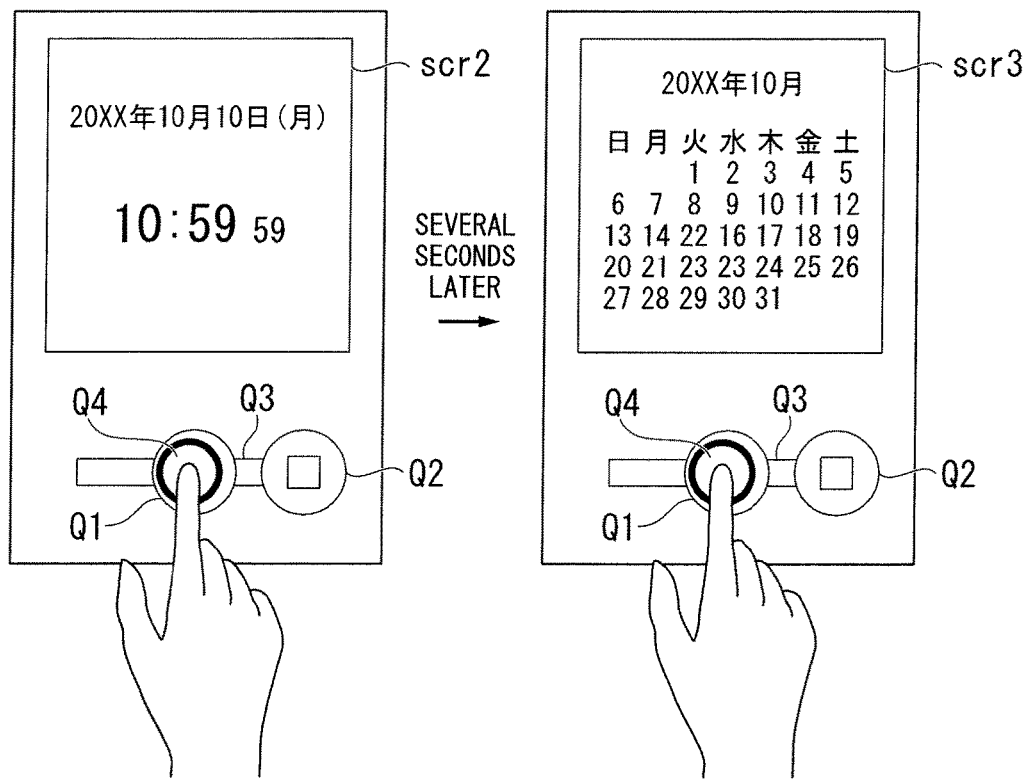
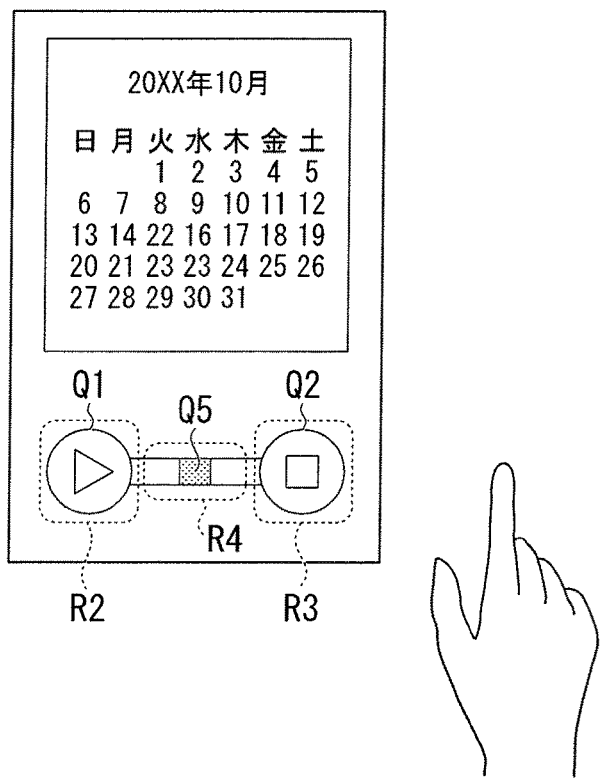

INFORMATION PROCESSING DEVICE HAVING UNLOCKING FUNCTION

CROSS-REFERENCE TO RELATED APPLICATIONS

This application is a national stage application of International Application No. PCT/JP2012/073127 entitled "INFORMATION PROCESSING DEVICE HAVING UNLOCKING FUNCTION", filed on Sep. 11, 2012, which claims the benefit of the priority of Japanese Patent Application No. 2011-202862, filed on Sep. 16, 2011, the disclosures of each of which are hereby incorporated by reference in their entirety.

TECHNICAL FIELD

The present invention relates to an information processing device having a touch panel and in particular to an information processing device having a function to release a locked state of a displayed content.

BACKGROUND ART

Recently, portable terminals such as smart phones and tablet terminals have become widespread. Technologies featuring user authentication techniques and screen display techniques have been developed for portable terminals and computer systems. For example, Patent Literature Document 1 discloses an authentication system built in an electronic device, which implements user authentication via a sensor used to detect a user's biological information or which implements user authentication by detecting visual or temporal input patterns. Patent Literature Document 2 discloses an image display method which automatically display a plurality of image areas on the computer screen with time differences via the Internet and which allows each user to arbitrarily carry out start display or stop display. Patent Literature Document 3 discloses a state transition determination program in ejecting an authentication device, which shows the locking of a computer upon detecting ejection of an authentication device while displaying an unlock screen. Patent Literature Document 4 discloses an Internet advertisement system using a monitor including a main screen and an auxiliary screen, wherein a main screen is displayed to show the main processing content of a user's program while an auxiliary screen is displayed to link a web page, a media display, and an operating environment display of a user's computer. Patent Literature Document 5 discloses a method and a device for protecting controls in graphic user interfaces (GUI) in a computer system, in which a protection shield or a cover is automatically eliminated from a control area when a user operates a protection icon to input a user's name and a password via an authentication box. Patent Literature Document 6 discloses a security protection method of a terminal device, in which a password store area and security state store area storing a locked or unlocked state are stored in an EEPROM of a terminal device.

Some portable terminals having touch panels may implement a locking function which limits an input operation to prevent a user's erroneous operation. For example, a lock screen displaying an unlock icon is displayed on the touch panel of a terminal in a locked state (i.e. a state to demonstrate a locking function). The terminal release the locked state when a user moves an unlock icon to a specific position on the touch panel. In the locked state, a user can recognize the present time without performing any operation to release the locked state in the terminal which displays the present time and the standby screen.

CITATION LIST

Patent Literature Document

Patent Literature Document 1: Japanese Patent Application Publication No. 2010-541046
Patent Literature Document 2: Japanese Patent Application Publication No. 2008-210395
Patent Literature Document 3: Japanese Patent Application Publication No. 2005-4389
Patent Literature Document 4: Japanese Patent Application Publication No. 2001-216439
Patent Literature Document 5: Japanese Patent Application Publication No. 2000-181597
Patent Literature Document 6: Japanese Patent Application Publication No. H06-35858

SUMMARY OF INVENTION

Technical Problem

In the foregoing conventional examples, in order to change the display content displayed in the locked state of a terminal, it is necessary for each user to change the display content of the locked state, which is registered via the environmental setting for each terminal, after releasing the locked state. For this reason, the conventional examples may suffer from low user's operability and troublesomeness in terminals.

It is an object of the present invention to provide an information processing device having an unlocking function which is designed to solve the above problem.

Solution to Problem

The present invention relates to an information processing device having a touch panel, which includes a display which displays a predetermined image; an operation part which accepts a user's operation; and a controller which controls the display content of the display in response to a user's switching operation which is carried out in the locked state of the display.

The present invention relates to an information processing method adapted to an information processing device having a touch panel, which includes the steps of: determining as to whether or not the locked state is released via a user's operation; displaying the predetermined lock screen in the locked state; and upon receiving a user's instruction to change the display content, changing the display content on the lock screen with a desired image.

The present invention relates to a program installed in an information processing device having a touch panel, which includes the steps of: determining as to whether or not the locked state is released via a user's operation; displaying the predetermined lock screen in the locked state; and upon receiving a user's instruction to change the display content, changing the display content on the lock screen with a desired image.

Specifically, the information processing device is a portable terminal which displays an unlock icon via an operation part on the touch panel so as to release the locked state or change the display content of the lock screen in response to a user's operation on the unlock icon.

Advantageous Effects of Invention

According to the present invention, it is possible to easily change the display content of the lock screen in the locked state of an information processing device. Additionally, it is possible to prevent the lock screen from being released or to prevent the display content from being unnecessarily changed due to a user's erroneous operation.

BRIEF DESCRIPTION OF DRAWINGS

FIG. 3 is a list showing applications which are displayed at starting and which are stored in the portable terminal according to the first embodiment of the present invention.

FIG. 5 includes enlarged front views showing a sequence of a slide operation to move an unlock icon with a user's finger in the lock screen shown in FIG. 4.

FIG. 6 includes enlarged front views showing a sequence of a user's operation subsequent to the slide operation with a user's finger shown in FIG. 5.

FIG. 14 includes enlarged front views showing a sequence of a user's operation subsequent to the slide operation shown in FIG. 13 with a user's finger.

DESCRIPTION OF EMBODIMENTS

An information processing device having an unlocking function according to the present invention will be described in detail with reference to the accompanying drawings.

First Embodiment

Figure 1:
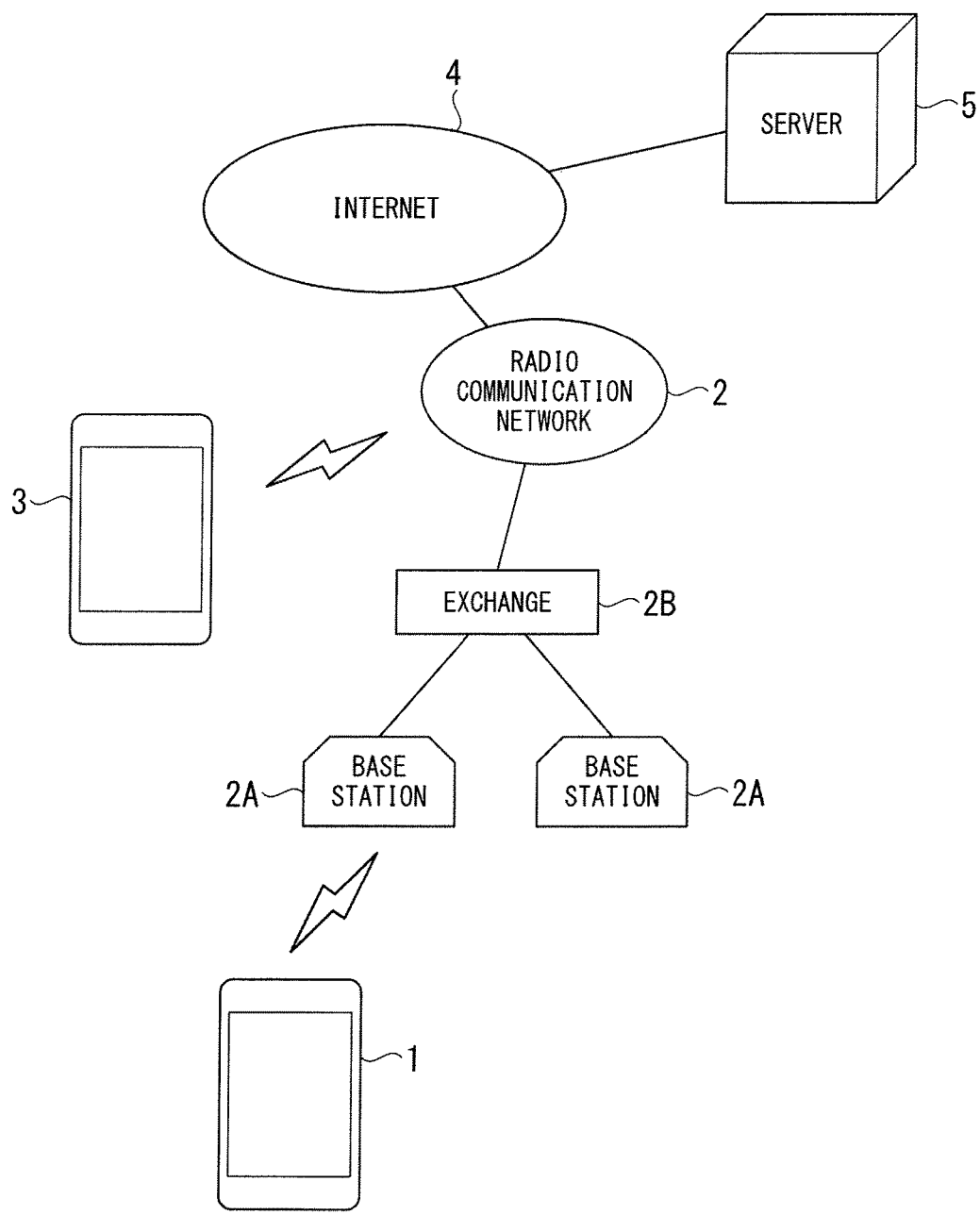
FIG. 1 is a configuration diagram of a communication network system adapted to a portable terminal according to the first embodiment of the present invention.

FIG. 1 is a configuration diagram of a communication network system adapted to a portable terminal 1 serving as an information processing device according to the first embodiment of the present invention. The information processing device of the present invention is not necessarily limited to the portable terminal 1 but applicable to smart phones, portable game devices, PDA (Personal Digital Assistant), tablet PC (Personal Computer), and note-type PC. For example, the portable terminal 1 is furnished with a call function, an electronic mail function, an Internet-connecting function (or a Web access function), and a television function to receive and view digital television broadcasting (e.g. one-segment terrestrial digital television broadcasting).

When the portable terminal 1 is connected to a radio communication network (or a mobile communication network) 2 via a nearby base station 2A and an exchange 2B, the portable terminal 1 is able to communicate with another portable terminal 3 via the radio communication network 2. When the portable terminal 1 is connected to the Internet 4 via the radio communication network 2, the portable terminal 1 is able to access and browse Websites. Additionally, it is possible to implement streaming to download and reproduce multimedia content such as moving images, still images, music, and news from a server 5 via the Internet 4 and the radio communication network 2.

Figure 2:
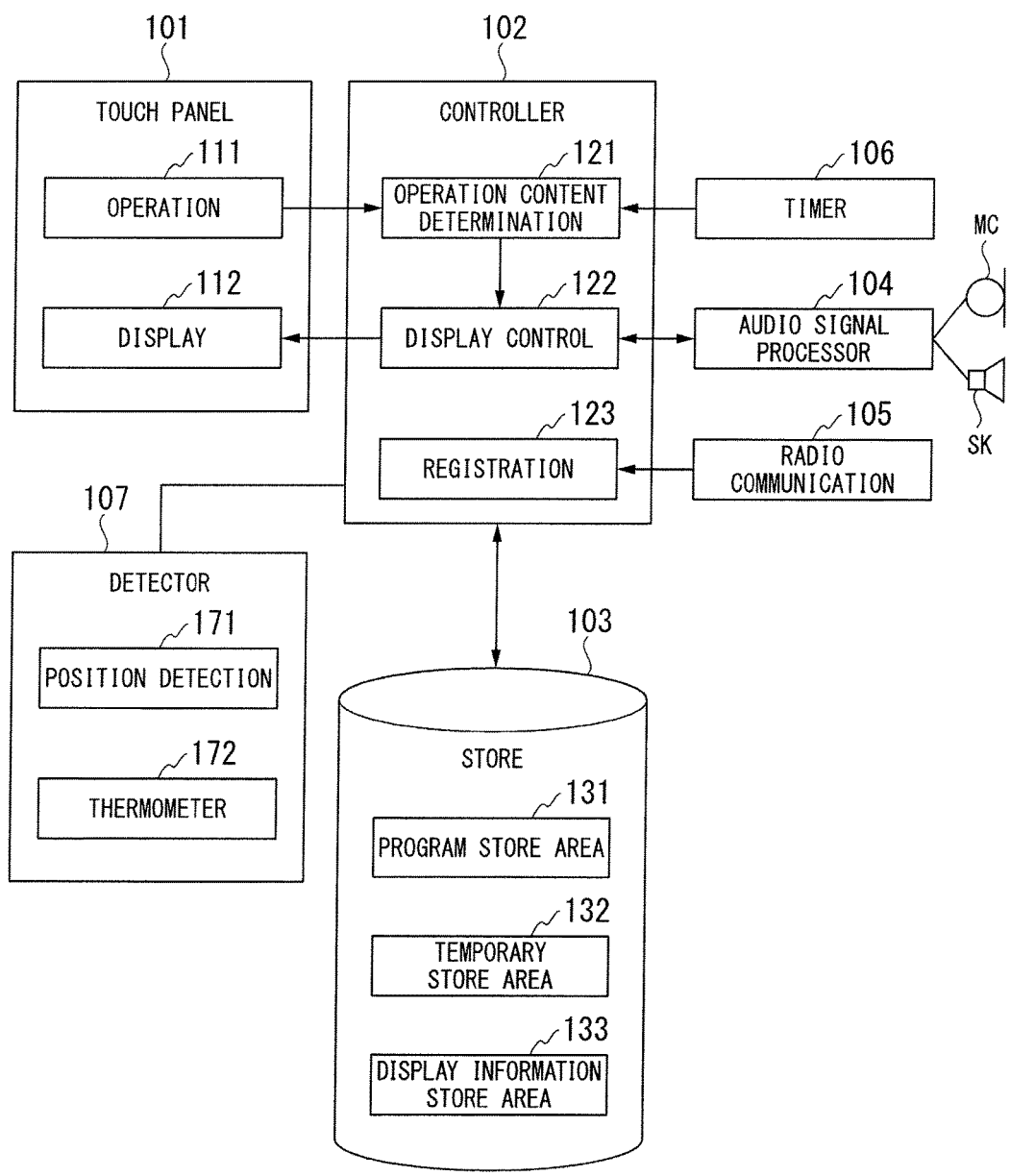
FIG. 2 is a block diagram showing the configuration of the portable terminal according to the first embodiment of the present invention.

FIG. 2 is a block diagram showing basic constituent elements of the portable terminal 1. The portable terminal 1 includes a touch pane 101, a controller 102, a store part 103, an audio signal processor 104, a radio communication part 105, a timer 106, and a detector 107. The portable terminal 1 displays a lock screen on the touch panel 101 in a locked state demonstrating a locking function. In the locked state, when a user inputs an unlock operation, the portable terminal 1 changes the setting to release the locked state while establishing an unlocked state. Upon changing the locked state to the unlocked state, the portable terminal 1 displays a hall screen or a menu screen based on the environmental setting information stored in the store part 103 in advance. As the environmental setting information, it is possible to store the information representing an icon or a screen which should be firstly displayed when the locked state is changed with the unlocked state.

The locked state refers to the state which restrains a part of input operations which can be input onto the touch panel 101. When the portable terminal 1 is set to the locked state, the portable terminal 1 accepts an operation input to an operation screen which is a partial area within the entire screen of the touch panel 101. That is, it is possible to restrict any operations input to areas other than the operation screen within the entire screen of the touch panel 101. The unlocked state refers to the state which releases restraint on input operations which were restrained in the locked state. In the unlocked state, the portable terminal 1 accepts any operations input onto the entire screen of the touch panel 101.

The touch panel 101 includes an operation part 111 and a display 112. The operation part 111 includes sensors which are used to accept user's operations, thus outputting sensors' detection results to the controller 102. The operation part 111 detects the touch position of a user's finger touching the operation screen at predetermined time intervals via sensors, thus outputting sensors' detection results. The configuration of the operation part 111 is not necessarily limited to this configuration. For example, it is possible to detect the position of a user's finger or to detect an operation indicating means approaching the operation screen via non-contact sensors. The display 112 displays the display content under the control of the controller 102. The display 112 is integrally unified with the operation part 111 as the touch panel 101, wherein the operation part 111 displays the operation screen used to accept operations.

The controller 102 reads various pieces of information stored in the store part 103 so as to entirely control the portable terminal 1. The controller 102 includes an operation content determination part 121, a display control part 122, and a registration part 123. The operation content determination part 121 determines the operation content accepted by the operation part 111 based on the output of the operation part 111. The operation content determination part 121 determines the movement of a user's finger based on the touch position and the touch time of a user's finger indicated by the detection result of the operation part 111. The operation content determination part 121 determines the operation content indicated by a user's finger based on the positional relationship between the movement of a user's finger and the image which is displayed on the display 112 upon receiving the operation. For example, the operation content determination part 121 determines that a user's operation indicates a touch operation when the operation part 111 detects a touch operation with a user's finger on an icon on the display screen. The operation content determination part 121 determines that a user's operation indicates a slide operation when the operation part 111 detects a move operation with a user's finger while a user's finger maintains a touch operation to specify an icon. Additionally, the operation content determination part 121 determines the operation content accepted by the operation part 111 based on the time information clocked by the timer 106.

The operation content determination part 121 instructs the display control part 122 to display the display content in response to the operation content based on the determination result. For example, when the operation content indicates a touch operation on the touch panel 101, the operation content determination part 121 controls the display control part 122 to display an icon, representing the touch position of a user's finger, to be superposed on the operation screen. For example, the operation content determination part 121 displays a finger icon, representing the touch position of a user's finger, on the touch panel 101.

The display control part 122 controls the display content displayed on the display 112 based on the determination result of the operation content determination part 121. The display control part 122 executes a lock screen display process which displays a lock screen on the display 112 and a display application switching process which switches over display application images. The lock screen display process is a process to display a lock screen on the display part 112. The detailed processing will be described later with reference to FIG. 9. The display application switching process changes a display application image displayed in a lock screen with another display application image in response to a user's operation to switch over display application images on the lock screen displayed on the display 112. The detailed processing will be described later with reference to FIG. 10.

When a user presses a switch (not shown) to turn of power, the display control part 112 turn off power with the display 112, and therefore the display 112 does not display any images. In the standby state of a power saving mode, when a user presses a switch to turn on power, the display control part 122 turns on power with the display 112, thus displaying a lock screen (i.e. a lock screen display process). In the state of displaying a lock screen, the display control part 122 changes the display content from the lock screen to the menu screen or from the lock screen to the home screen in response to a user's operation to release the locked state with the operation part 111. In the state of displaying the lock screen, a display application image displayed on the lock screen is switched to another display application image (i.e. a display application switching process) in response to a user's operation to switch over display application images.

The registration part 123 registers data, which the radio communication part 105 receives from the server 5 via the Internet 4, in the store part 103. The registration part 103 downloads a display application, which is used to control an image displayed on the lock screen of the portable terminal 1, from server 5 so as to store it in the store part 103. The store part 103 stores various pieces of information which are used for the processing of the portable terminal 1. The store part 103 includes a program store area 131, a temporary store area 132, and a display information store area 133. For example, the store part 103 can be configured to include detachable portable memory devices (or recording media) such as SD cards, IC cards, and external hard-disk units. Additionally, the store part 103 may be installed in an external server (not shown).

The program store area 131 is a store area which stores programs and various applications to implement predetermined functions in response to various operations via the portable terminal 1. The program store area 131 stores display applications app1, app2, app3, app4, app5, app6. Unique identifications (hereinafter, referred to as "application ID") are assigned to discriminate the display applications app1 to app6.

The display application app1 is an application to display a magnetic bearing image scr1 representing the bearing corresponding to the present position on the display 112. An application ID "A001" is assigned to the display application app1 (or the magnetic bearing application app1). The display application app2 is an application to display a clock image scr2 representing the current time on the display 112. An application ID "A002" is assigned to the display application app2 (or the clock application app2). The display application app3 is an application to display a calendar image scr3 on the display 112. An application ID "A003" is assigned to the display application app3 (or the calendar application app3). The display application app4 is a application to display a news image scr4 representing topics of news information opened via the Internet on the display 112. The display application app5 is an application to display an atmospheric pressure display image scr5 representing the current atmospheric pressure on the display 112. The display application app6 is an application to display a temperature display image scr6 representing the current temperature on the display 112. Application IDs "A004", "A005", "A006" are assigned to the display applications app4, app5, app6.

The temporary store area 132 is a store area to temporarily store various pieces of information which are needed to operate the portable terminal 1. For example, the temporary store area 132 is used to temporarily store flag information, timer information, and image information displayed on the screen 112. The flag information is information to specify a display application used to display a display application image on the lock screen. When the display application switching process switches over display application images, the registration part 123 writes the flag information, representing the information which specifies the display application in the display application image after switching, in the temporary store area 132. The timer information is information to indicate the time clocked by the timer 106.

The display information store area 133 stores information which is defined as a starting display application among display applications app1 to app6 stored in the program store area 131. The starting display application refers to a display application which is determined as a display application image in advance in the lock screen display process via the initial setting and a display application which is defined via a user's operation in the display application switching process. The display information store area 133 stores display application starting information 134 shown in FIG. 3 as the information representing the starting display application. FIG. 3 shows display applications which are determined as display application images via the initial setting in advance.

As shown in FIG. 3, the display application starting information 134 is a table in which display flags are assigned to the information representing the display applications app1 to app6 (i.e. application IDs and names of display applications). A display flag "1" is assigned to a display application which is determined as a display application image via the initial setting in the lock screen display process in advance. That is, display flags "0" assigned to display applications indicate that those display applications do not match the display application which is determined as a display application image via the initial setting in the lock screen display process in advance. In this connection, the information representing the display applications app1 to app6 may indicate either an application ID or the name of a display application. In FIG. 3, a display flag "1" is assigned to the magnetic bearing application app1 having the application ID "A001". In the display application starting information 134, display flags are rewritten in response to a user's operation which instructs the display application switching process to switch over display application images so as to define a display application image. For example, a display flag "1" is assigned to a display application of a display application image displayed on the lock screen in response to a user's operation to define the display application image.

The audio signal processor 104 is equipped with a microphone MC and a speaker SK. Upon inputting an analog audio signal via the microphone MC, it performs A/D conversion on the analog audio signal so as to output digital audio data to the display control part 122. Upon inputting digital audio data from the display control part 122, the audio signal processor 104 performs A/D conversion on the digital audio data so as to output an analog audio signal to the speaker SK.

Upon activating the call function, the electronic mail function, or the Internet-connecting function, the radio communication part 105 carries out data reception/transmission with the nearby base station 2A via an antenna. The timer 106 outputs a clock signal at predetermined time intervals. The detector 107 includes a position detection part 171 and a thermometer 172. The position detection part 171 has a GPS (Global Positioning System) receiver to detect the present position of the portable terminal 1, thus outputting the present position to the controller 102. The thermometer 172 detects the ambient temperature of the portable terminal 1 so as to output the ambient temperature to the controller 102.

Figure 4:
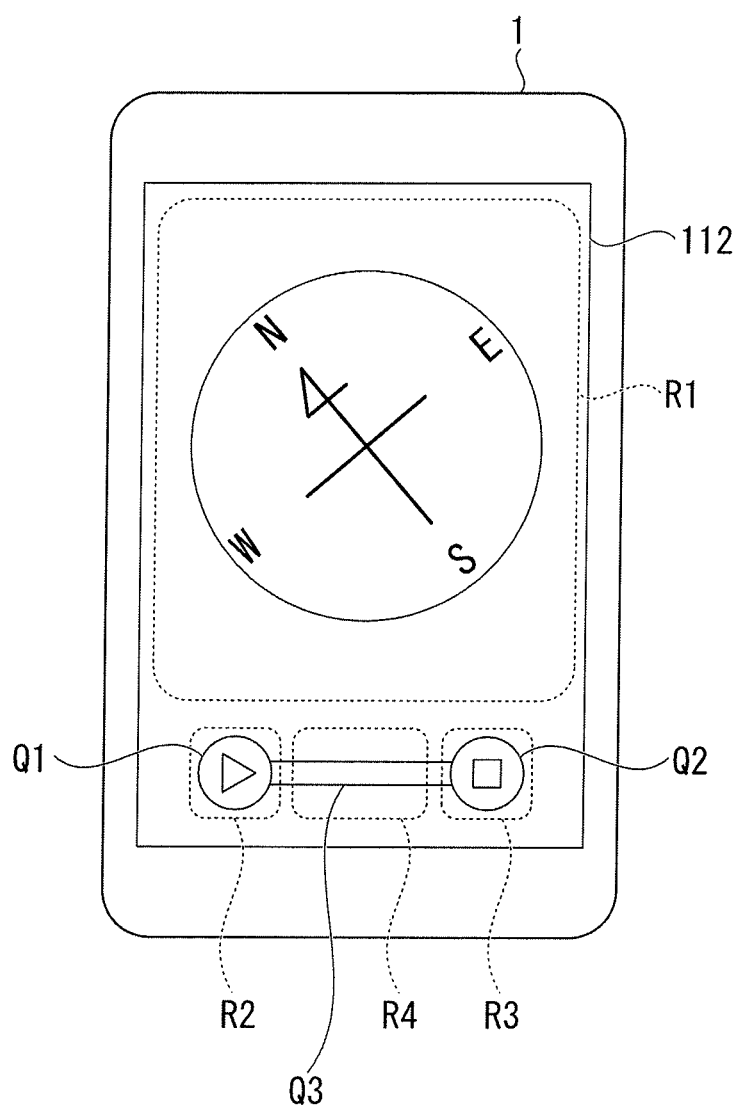
FIG. 4 is an enlarged front view showing an example of a lock screen in the portable terminal according to the first embodiment of the present invention.

Next, the operation of the portable terminal 1 will be described with reference to FIGS. 4 to 7. Upon executing the lock screen display process, the display control part 102 displays a display application image via the initial setting on the lock screen. As shown in FIG. 3, the magnetic bearing application app1 is determined as a display application via the initial setting. Therefore, the display control part 122 displays the magnetic bearing image scr1 on the display 112. FIG. 4 shows an example of the lock screen displaying the magnetic bearing image scr1 after the lock screen display process.

As shown in FIG. 4, the portable terminal 1 displays the lock screen, including a first display area R1, a second display area R2, a third display area R3, and a fourth display area R4, on the display part 112. The first display area R1 is an area to display a display application image. The second display area R2 is an area to display an unlock icon Q1 at the initial position. The third display area R3 is an area to display an end mark Q2 representing the final position of the unlock icon Q1. The fourth display area R4 is an area to display a slide bar Q3 along which the unlock icon Q1 is moved. In the locked state, the operation content determination part 121 accepts operations applied to the second display area R2, the third display area R3, and the fourth display area R4. That is, operations are restrained in the first display area R1 in the locked state; hence, the operation content determination part 121 does not accept any operations applied to the first display area R1. Herein, the operation screen available in the locked state may include the second display area R2, the third display area R3, and the fourth display area R4.

Next, an example of a user's operation applied to the lock screen shown in FIG. 4 will be described with reference to FIG. 5. FIG. 5 shows a sequence of a slide operation in which the unlock icon Q1 is moved with a user's finger on the lock screen. When a user touches the unlock icon Q1 with a user's finger on the lock screen, as shown in FIG. 5(a), a round-shaped finger icon Q4 is displayed over the unlock icon Q1. Thereafter, when a user moves a finger towards the end mark Q2 while maintaining the finger touching the surface of the touch panel 101, as shown in FIG. 5(b), an arrow-shaped finger icon Q4, representing a moving direction, is displayed over the slide bar Q3 on the lock screen. Herein, the unlock icon Q1 is moved to track the movement of a user's finger. Next, when a user further moves a finger towards the end mark Q2 while maintaining the finger touching the surface of the touch panel 101, as shown in FIG. 5(c), the finger icon Q4 may be superposed on the end mark Q2. When a user stops moving a finger after moving the finger to the end mark Q2, as shown in FIG. 5(d), the arrow-shaped finger icon Q4 is changed to a round shape and then displayed over the end mark Q2 on the lock screen.

Next, a user's operation subsequent to the slide operation with a user's finger shown in FIG. 5 will be described with reference to FIG. 6. When a user maintains the touching state for the predetermined time or more without removing a finger from the surface of the touch panel 101 on the condition that the unlock icon Q1 is moved to the end mark Q2, as shown in FIG. 6(a), the display application image is changed from the magnetic bearing scr1 to the clock image scr2 on the lock screen. When a user further maintains the touching state for the predetermined time or more without removing a finger from the surface of the touch panel 101, a display application switching process is executed again as shown in FIG. 6(b), and therefore the display application image is changed from the clock image scr2 to the calendar image scr3 on the lock screen. Thereafter, when a user removes a finger from the surface of the touch panel 101, the portable terminal 1 accepts a user's operation to define the calendar image scr3 as the display application image. Therefore, even when a user removes a finger from the surface of the touch panel 101, as shown in FIG. 6(c), the calendar image scr3 is continuously displayed as the display application image on the lock screen. As shown in FIG. 6(c), the unlock icon Q1 is returned to the second display area R2.

Figure 7:
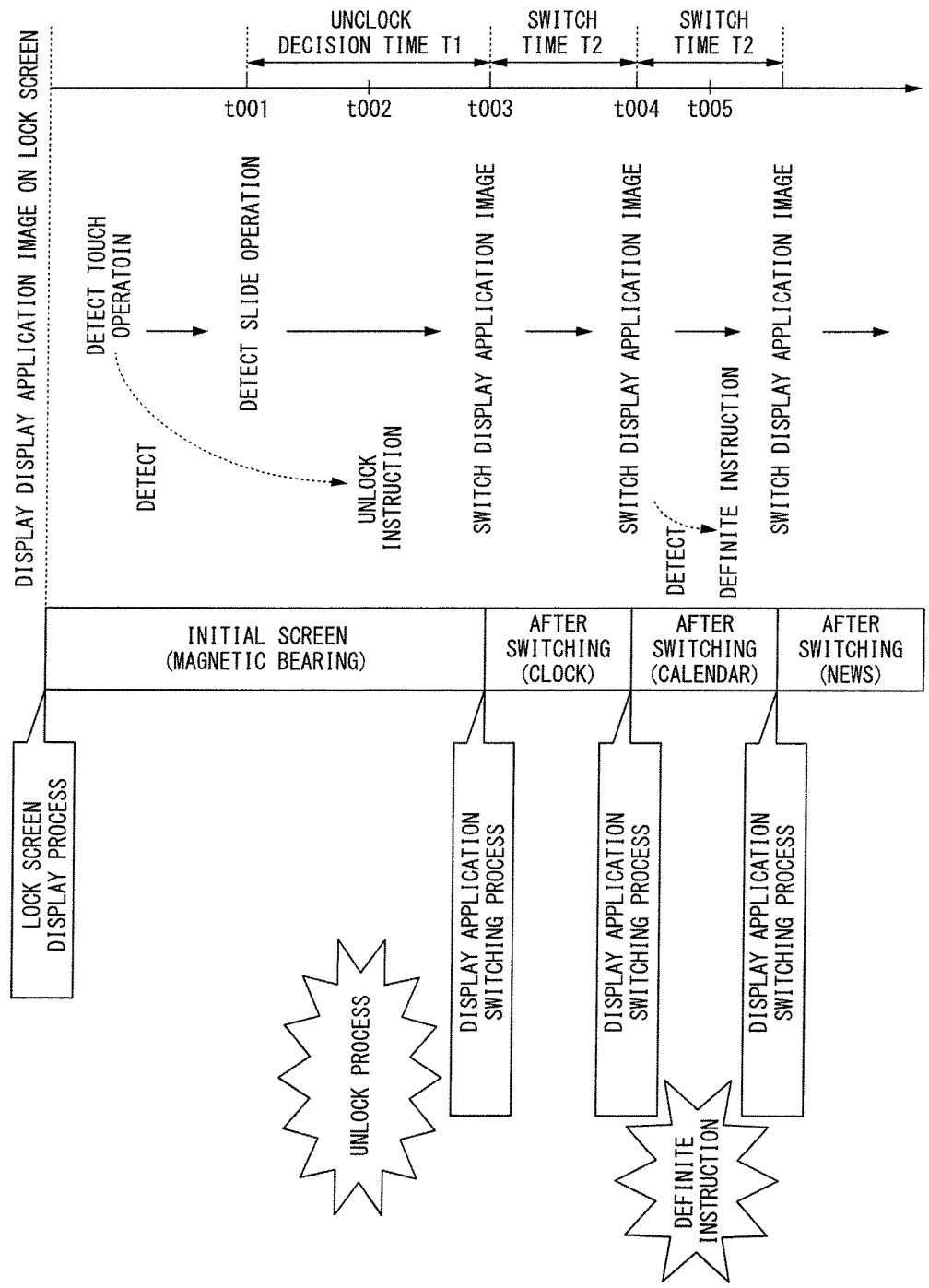
FIG. 7 is a time sequence diagram regarding display application switching processes in the portable terminal in response to user's operations which are explained in FIGS. 5 and 6.

Next, the operation of the portable terminal 1 in response to a user's operations explained in FIGS. 5 and 6 will be described in a time-series manner with reference to FIG. 7. FIG. 7 is a time-series sequence diagram regarding the display application switching process of the portable terminal 1 in response to a user's operations explained in FIGS. 5 and 6. When the portable terminal 1 executes the lock screen display process, the display control part 122 displays the magnetic bearing image scr1 (see FIG. 4) as a display application image via the initial setting. As shown in FIG. 5(a), the operation content determination part 121 detects a touch operation when a user touches the second display area R2 with a finger. Next, when a user carries out a move operation on the unlock icon Q1 with a finger, as shown in FIG. 5(b), the operation content determination part 121 detects a slide operation. The operation content determination part 121 determines as to whether or not the detected slide operation indicates an unlocking operation. The operation content determination part 121 determines as to whether or not a user maintains the touching state of the unlock icon Q1 for the predetermined time or more after sliding the unlock icon Q1 to the end mark Q2 with a finger (see FIG. 5(c), (d)). As a specific time which is used to determine as to whether or not a user's operation is carried out to instruct an unlocking operation, an unlock decision time T1 having the predetermined time length is stored in the store part 103. For example, the unlock decision time T1 is set to three seconds.

The controller 102 releases the locked state when the operation content determination part 121 determines that a user releases a touch operation at the predetermined time (t002) before the unlock decision time T1 elapses from the time (t001) of detecting a user's slide operation. When a user's touch operation is continued at the time (t003) at which the unlock decision time T1 elapses from the time (t00) of detecting a user's slide operation, i.e. when the operation content determination part 121 determines that a user's touch operation is not released within the unlock decision time T1, the display control part 122 executes the display application switching process at the time (t003) at which the unlock decision time T1 elapses. Thus, as shown in FIG. 6(a), the display control part 122 changes the display application image on the lock screen from the magnetic bearing image scr1 to the clock image scr2.

Next, the operation content determination part 121 determines as to whether or not a user maintains the touching state of the unlock icon Q1 for the predetermined time or more. As a specific time used to determine execution of the display application switching process, a switch time T2 having the predetermined time length is stored in the store part 103. For example, the switch time T2 is set to two seconds. When a user's touch operation is continued at the time (t004) at which the switch time T2 elapses from the execution time (T003) of the display application switching process, i.e. when the operation content determination part 121 determines that the touch operation is not released within the switch time T2, the display control part 122 executes the display application switching process again at the time (t004) at which the switch time T2 elapses. Thus, as shown in FIG. 6(b), the display control part 122 changes the display application image on the lock screen from the clock image scr2 to the calendar image scr3.

Moreover, when a user's touch operation is released at the time (t005) before the switch time T2 elapses from the execution time (t004) of the display application switching process, the operation content determination part 121 determines that a user's operation to define the display application images as the image displayed on the touch panel 101 is accepted at the time (t005). Thus, as shown in FIG. 6(c), the operation content determination part 121 accepts a user's operation to define the display application image, and therefore the display part 112 continuously displays the calendar image scr3. The registration part 123 writes the information, indicating that the calendar image scr3 is defined as the display application image which is displayed when a user's touch operation is released, in the store part 103. For example, the display flag assigned to the application ID "A001" of the magnetic bearing application app 1 is changed from "1" to "0" while the flag information assigned to the application ID "A003" of the calendar application app3 is set to "1" in the display application starting information 134 of the registration part 123.

Figure 8:
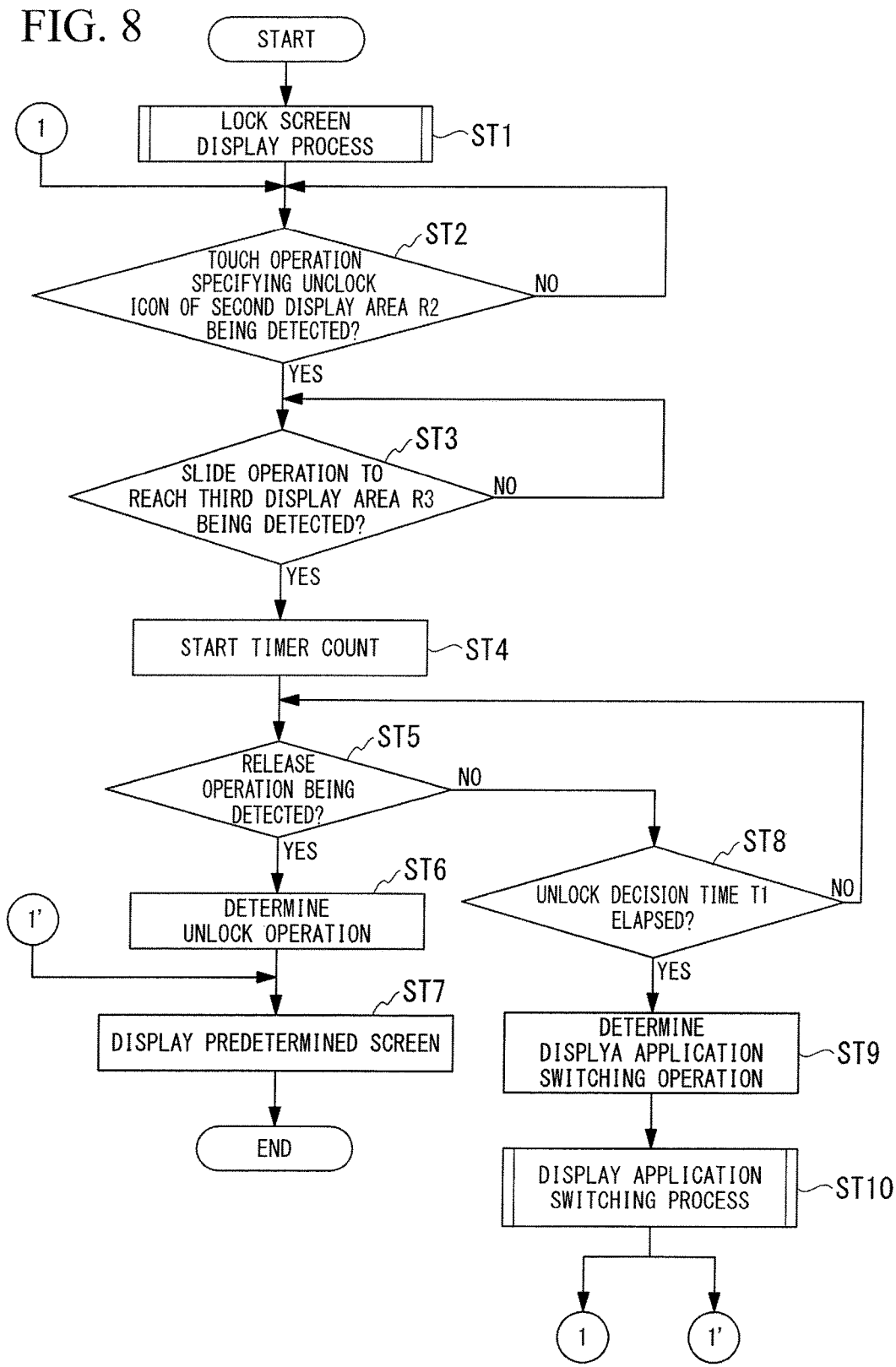
FIG. 8 is a flowchart showing a basic process of the portable terminal according to the first embodiment of the present invention.
Figure 9:
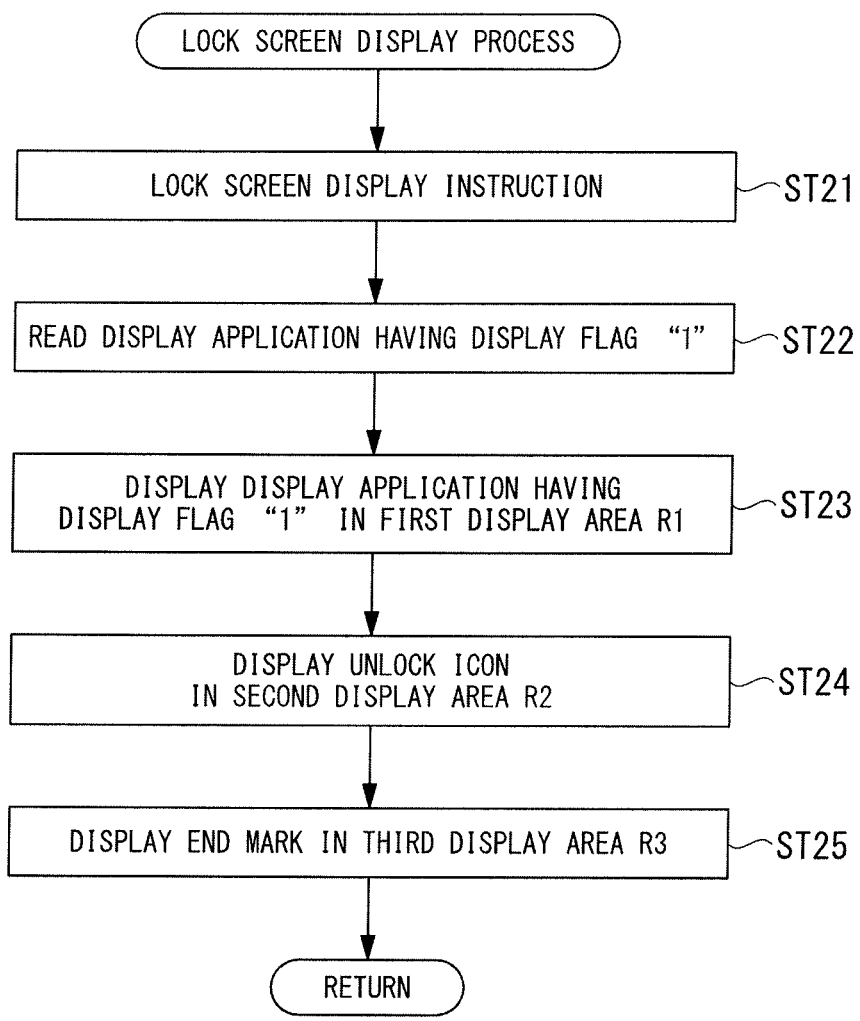
FIG. 9 is a flowchart showing a lock screen display process of the portable terminal according to the first embodiment of the present invention.
Figure 10:
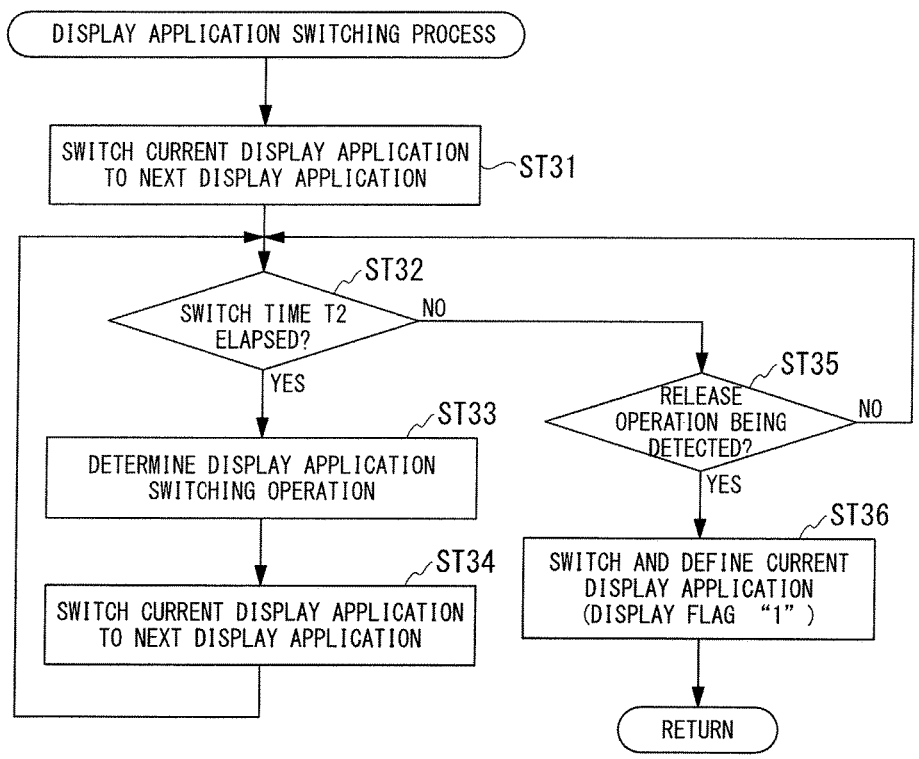
FIG. 10 is a flowchart showing a display application switching process of the portable terminal according to the first embodiment of the present invention.

Next, an example of processing of the portable terminal 1 will be described with reference to FIGS. 8 to 10. First, the basic process of the portable terminal 1 will be described with reference to FIG. 8.

(Step ST1)

First, the portable terminal 1 executes the lock screen display process to display the lock screen shown in FIG. 4 on the display 112. That is, the display part 112 displays the magnetic bearing image scr1 of the magnetic bearing application app1 which is determined as the display application image via the initial setting on the lock screen in the first display area R1. Additionally, the display part 112 displays the unlock icon Q1 in the second display area R2 while displaying the end mark Q2 in the third display area R3.

(Step ST2)

The operation content determination part 121 determines as to whether or not a user's touch operation on the unlock icon Q1 in the second display area R2 is detected based on the output of the operation part 111. The operation content determination part 121 repeats the decision of step ST2 until a user's touch operation on the unlock icon Q1 is detected.

(Step ST3)

Upon detecting a user's operation on the unlock icon Q1, the operation content determination part 121 determines as to whether or not a slide operation to move the unlock icon Q1 towards the end mark Q2 in the third display area R3 is detected while the user's operation is maintained. Upon detecting a user's touch operation on the unlock icon Q1, the operation content determination part 121 repeats the decision of step ST3 until a slide operation to move the unlock icon Q1 towards the end mark Q2 is detected.

(Step ST4)

Upon detecting a slide operation to move the unlock icon Q1 towards the end mark Q2, the operation content determination part 121 counts an elapsed time from the time of detecting the slide operation to move the unlock icon Q1 towards the end mark Q2 based on the time clocked by the timer 106. The controller 102 writes the timer information, counting up the elapsed time, in the temporary store area 132.

(Step ST5)

The operation content determination part 121 determines as to whether or not an unlocking operation is carried out. That is, the operation content determination part 121 determines as to whether or not a user's touch operation on the unlock icon Q1 is released within the predetermined unlock decision time T1. Specifically, the operation content determination part 121 determines as to whether or not a user removes a finger from the surface of the touch panel 101 at the time (t002) before the unlock decision time T1 elapses from the time (t001) of detecting a slide operation to move the unlock icon Q1 to the end mark Q2 based on the output of the operation part 11.

(Step ST6)

The operation content determination part 121 determines that an unlocking operation is carried out when a user's finger is removed from the surface of the touch panel 101 at the time (t002) before the unlock decision time T1 elapses from the time (t001) of detecting a slide operation.

(Step ST7)

When an unlocking operation is carried out, the display control part 122 displays the predetermined screen corresponding to the unlocking operation on the display 112. The display control part 122 displays the home screen or the menu screen on the display 112. Thereafter, the controller 102 releases the locked state so as to establish an unlocked state.

(Step ST8)

When a user's finger is not removed from the surface of the touch panel 101 in step ST5, i.e. when a user's touch operation on the unlock icon Q1 is not released, the operation content determination part 121 determines as to whether or not the unlock decision time T1 elapses. Herein, the flow returns to step ST5 when the operation content determination part 121 determines that the unlock decision time T1 does not elapse.

(Step ST9)

In step ST8, the operation content determination part 121 determines that a display application switching operation is carried out to instruct a change of a display application image, which is displayed on the lock screen, at the time (t003) at which the unlock decision time T1 elapses from the time (t001) of detecting a slide operation on the unlock icon Q1.

(Step ST10)

Thereafter, the display control part 122 executes a display application switching process. Thus, the display application image displayed on the lock screen is changed from the magnetic bearing image scr1 of the magnetic bearing application app1 via the initial setting to display images of other display applications (app2, app3, etc.).

After the display application switching process is executed in step ST10, the flow may return to step ST2 so as to continue the processes of step ST2 onwards in the locked state. Alternatively, after step ST10, the flow may return to step ST7 so as to release the locked state.

Next, an example of the lock screen display process will be described with reference to FIG. 9.

(Step ST21)

The portable terminal 1 receives an instruction to display the lock screen via the operation part 111. For example, the operation content determination part 121 determines that the display instruction of the lock screen is accepted when a power switch (not shown) is pressed during the standby state in a power saving mode. The operation content determination part 121 outputs the information, indicating the acceptance of the display instruction of the lock screen to the display control part 122.

(Step ST22)

The display control part 122 searches for a display application having a display flag "1" with reference to the display application starting information 134 of the store part 103. In FIG. 3, a display flag "1" is set to the application ID "A001" of the magnetic bearing application app1. For this reason, the display control part 122 starts the magnetic bearing application app1.

(Step ST23)

The display control part 122 displays the magnetic bearing image scr1 of the magnetic bearing application app1 in the first display area R1. The registration part 123 rewrites the flag information of the temporary store part 132. The registration part 123 writes the information representing the lately started display application as the flag information. That is, the registration part 123 writes the application ID "A001" of the magnetic bearing application app1 as the flag information.

(Step ST24)

The display control part 122 displays the unlock icon Q1 in the second display area R2.

(Step ST25)

The display control part 122 displays the end mark Q2 in the third display area R3.

Thus, when the display control part 122 executes the lock screen display process, the display part 112 displays the magnetic bearing image scr1 of the magnetic bearing application app1, which is determined as the display application image via the initial setting on the lock screen in advance, in the first display area R1 while displaying the unlock icon Q1 in the second display area R2 and the end mark Q2 in the third display area R3.

Next, an example of the display application switching process of the portable terminal 1 will be described with reference to FIG. 10.

(Step ST31)

In the portable terminal 1, when the operation content determination part 121 determines that a display application switching operation is carried out (e.g. step ST9 in FIG. 8), the display control part 122 detects a display application stored as flag information with reference to the temporary store area 132. In step ST23 of FIG. 9, the application ID "A001" of the magnetic bearing application app1 is written as the flag information of the temporary store area 132. The display control part 122 starts the clock application app2 in connection with the magnetic bearing application app1 having the application ID "A001" with reference to the display application starting information 134. The display control part 122 displays the clock image scr2 of the clock application app2 in the first display area R1. Herein, the display contents of the second display area R2 and the third display area R3 are not changed. That is, the display part 112 displays the clock image scr2 of the clock application app2 in the first area R1 while displaying the unlock icon Q1 in the second display area R2 and the end mark Q3 in the third display area R3. The registration part 123 rewrites the flag information of the temporary store area 132. For example the registration part 123 writes the information of the lately started clock application app2 as the flag information. That is, the registration part 123 writes the application ID "A002" of the clock application app2 as the flag information.

(Step ST32)

The operation content determination part 121 determines as to whether or not the switch time T2 elapses from the time (t003) of switching over display application images in the locked state in step ST31.

(Step ST33)

The operation content determination part 121 determines that a display application switching operation to change the display application image, which is displayed in the lock screen, is carried out at the time (t004) at which the switch time T2 elapses from the time (t003).

(Step ST34)

When the operation content determination part 121 determines that a display application switching operation is carried out, the display control part 122 searches for a display application stored as flag information with reference to the temporary store area 132 of the store part 103. In step ST31, the flag information is rewritten in the temporary store part 132 such that the application ID "A002" of the clock application app2 is stored as the flag information. Thus, the display control part 122 starts the calendar application app3, which is placed next to the clock application app2 having the application ID "A002", with reference to the display application starting information 134. The display control part 122 displays the calendar image scr3 of the calendar application app3 in the first display area R1 on the display 112. Herein, the display contents of the second display area R2 and the third display area R3 are not changed. That is, the display part 112 displays the calendar image scr3 of the calendar application app3 in the first display area R1 while displaying the unlock icon Q1 in the second display area R2 and the end mark Q2 in the third display area R3. Thereafter, the registration part 123 rewrites the flag information in the temporary store part 132. For example, the registration part 123 writes the information of the lately started display application as the flag information. That is, the application ID "A003" of the calendar application app3 is written as the flag information.

(Step ST35)

When the decision result of step ST32 is "NO", the operation content determination part 121 determines as to whether or not a user's touch operation on the unlock icon Q1 is released. For example, the operation content determination part 121 determines as to whether or not a user's finger is removed from the surface of the touch panel 101 at the time (t005) before the switch time T2 elapses from the time (t004) at which a display application switching process is carried out to switch over display application images.

(Step ST36)

When a user's finger is removed from the surface of the touch panel 101 at the time (t005) before the switch time T2 elapses from the time (t004) at which a display application switching process is carried out to switch over display application images, the operation content determination part 121 detects that a user's operation is released, thus exiting the display application switching process. That is, the operation content determination part 121 determines to accept a user's instruction to define a display application image so as to exit the process of switching display application images displayed on the lock screen, thus defining the currently displayed image as a display application image for use in the lock screen. The registration part 123 changes the display flag of the application ID of the display application from "1" to "0" in the display application starting information 134. The registration part 123 rewrites the display flag of the application ID of the display application, which is stored in the temporary store area 132 as the flag information, with "1". That is, the registration part 123 changes the display flag of the application ID "A001" of the magnetic bearing application app1 from "1" to "0" in the display application starting information 134. Additionally, the registration part 123 rewrites the display flag of the application ID "A003" of the calendar application app3, which is stored in the temporary store area 132 as the flag information, with "1".

As described above, the portable terminal 1 is able to change the display content of a display application image displayed on the lock screen without needing an unlocking operation as an independent operation in the locked state. Therefore, it is possible to improve the user's operability with the portable terminal 1. In the setting in which the locked state is released after exit of a display application switching process, it is possible to instruct the release of the locked state by executing a display application switching operation. Thus, it is possible to further improve the user's operability with the portable terminal 1.

Additionally, the portable terminal 1 allows each user to carry out an unlocking operation and a display switching operation by operating the unlock icon Q1. Thus, it is possible for each user to easily change a display application displayed on the lock screen by carrying out the predetermined operation on the unlock icon Q1 (i.e. any operations other than an unlocking operation). To prevent a user's erroneous operation, plenty of operations which become effective in the limited display areas exist in the lock screen. Additionally, the display area encompassing the unlock icon Q1 is effective. It is possible to switch over display applications without increasing the possibility of causing erroneous operations by switching over display applications via operations applied to the effective display area.

The portable terminal 1 determines that a display application switching operation is carried out when a user maintains a touching state on the touch panel 101 on the condition that the unlock icon Q1 is moved to the end mark Q2 representing an unlocking position. Similar to an unlocking operation, a user carries out a move operation to move the unlock icon Q1 from the second display area R2 to the third display area R3. Unlike an unlocking operation, it is possible for each user to easily switch over display applications displayed on the lock screen by maintaining the unlock icon Q1 in the third display area R3. Thus, a different operation which may resemble an unlocking operation is used as a display application switching operation; hence, it is possible for each user to sue the same display area as the display area used for an unlocking operation, it is possible to limit the display area which makes operations effective, and it is possible to prevent user's erroneous operations. Since this operation resembles an unlocking operation, it is unnecessary for each user to newly remember operations of different systems.

Figure 11:
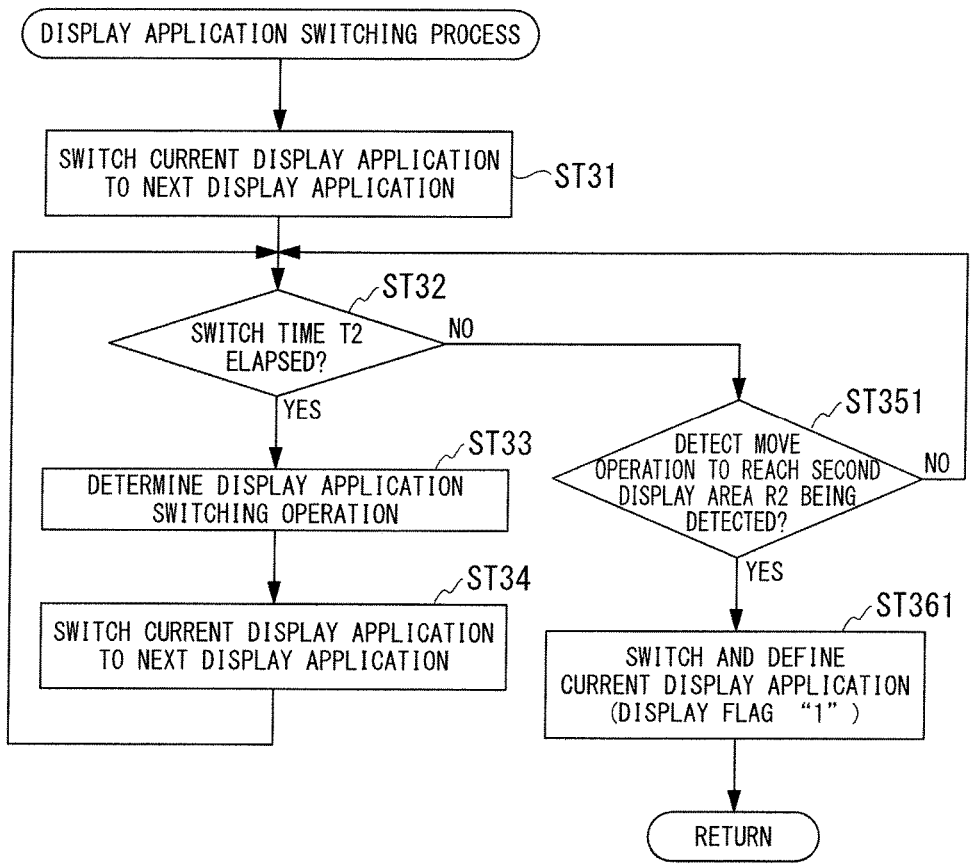
FIG. 11 is a flowchart showing a display application switching process of the portable terminal according to a variation of the first embodiment of the present invention.

It is possible to partially modify the processing of the portable terminal 1 according to the first embodiment, thus adopting a display application switching process shown in FIG. 11. In the display application switching process of FIG. 11, steps ST31 to ST34 are identical to those of the display application switching process of FIG. 10, whereas steps ST35 and ST36 are changed with steps ST351 and ST361. Thus, steps ST351 and ST361 will be described below.

(Step ST351)

When the decision result of step ST32 is "NO", i.e. at the time (t004) before the switch time T2 elapses from the time (t003) of switching over display application images via a display application switching process, the operation content determination part 121 determines as to whether or not the unlock icon Q1 is moved to the second display area R2 corresponding to the initial position. To carry out a display application switching process, the operation content determination part 121 determines as to whether or not the unlock icon Q1, which was moved from the second display area R2 to the third display area R3 via a user's slide operation, is returned again to the second display area R2 from the third display area R3.
(Step ST361)

When the unlock icon Q1 is returned to the second display area R2 from the third display area R3 before the switch time T2 elapses from the time (t003) of switching over display application images via a display application switching process, the operation content determination part 121 defines a display application image. That is, the operation contend determination part 121 determines to accept a user's instruction to define a display application image so as to exit the process of switching display application images displayed on the lock screen, thus defining the currently displayed image as a display application image for use in the lock screen. The registration part 123 changes the display flag of the application ID of the display application form "1" to "0" in the display application starting information 134. The registration part 123 rewrites the display flag of the application ID of the display application, which is stored as the flag information in the temporary store area 132, with "1".

Second Embodiment

A portable terminal 11 according to the second embodiment of the present invention will be described in detail with reference to FIGS. 12 to 16. The portable terminal 11 of the second embodiment has the same configuration as the portable terminal 1 of the first embodiment. The operation of the portable terminal 11 of the second embodiment will be described with reference to FIGS. 12 to 14.

First, upon executing a lock screen display process, the display control part 122 displays a display application image via the initial setting on the lock screen. In the portable terminal 11 of the second embodiment, as shown in FIG. 3, the magnetic bearing application app1 is determined as a display application image via the initial setting. The display control part 122 displays the magnetic bearing image scr1 shown in FIG. 12 on the display 112.

Figure 12:
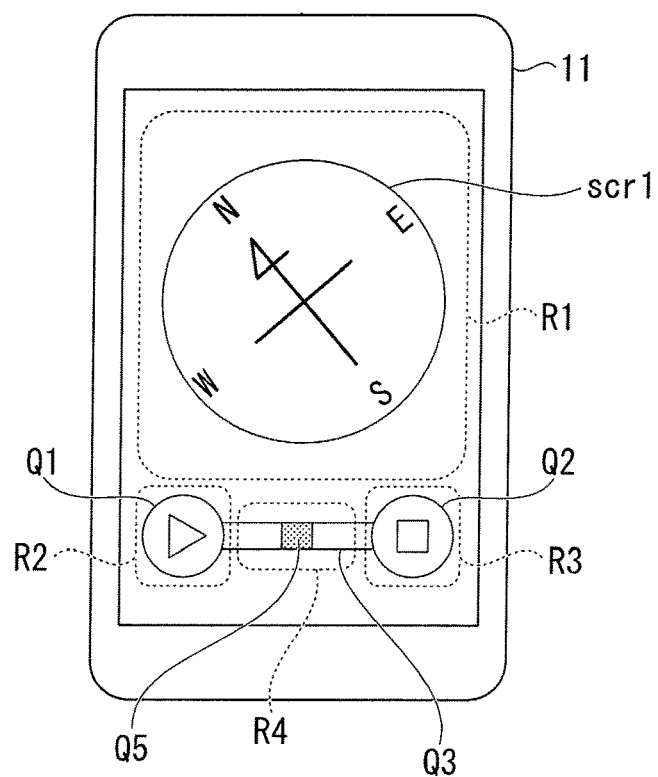
FIG. 12 is an enlarged front view showing an example of a lock screen of a portable terminal according to the second embodiment of the present invention.

As shown in FIG. 12, the lock screen which is displayed on the display 112 of the portable terminal 11 includes the first display area R1, the second display area R2, the third display area R3, and the fourth display area R4. The fourth display area R4 is an area to display the slide bar Q3 along which the unlock icon Q1 is moved. A display switching mark Q4 is disposed at the intermediate position of the slide bar Q3 in the longitudinal direction. In the locked state, the operation content determination part 121 accepts user's operations applied to the second display area R2, the third display area R3, and the fourth display area R4. In the locked state, any operations are restrained in the first display area R1; hence, the operation content determination part 121 does not accept user's operations applied to the first display area R1. That is, in the locked state, user's operations are accepted in the second display area R2, the third display area R3, and the fourth display area R4.

Figure 13:
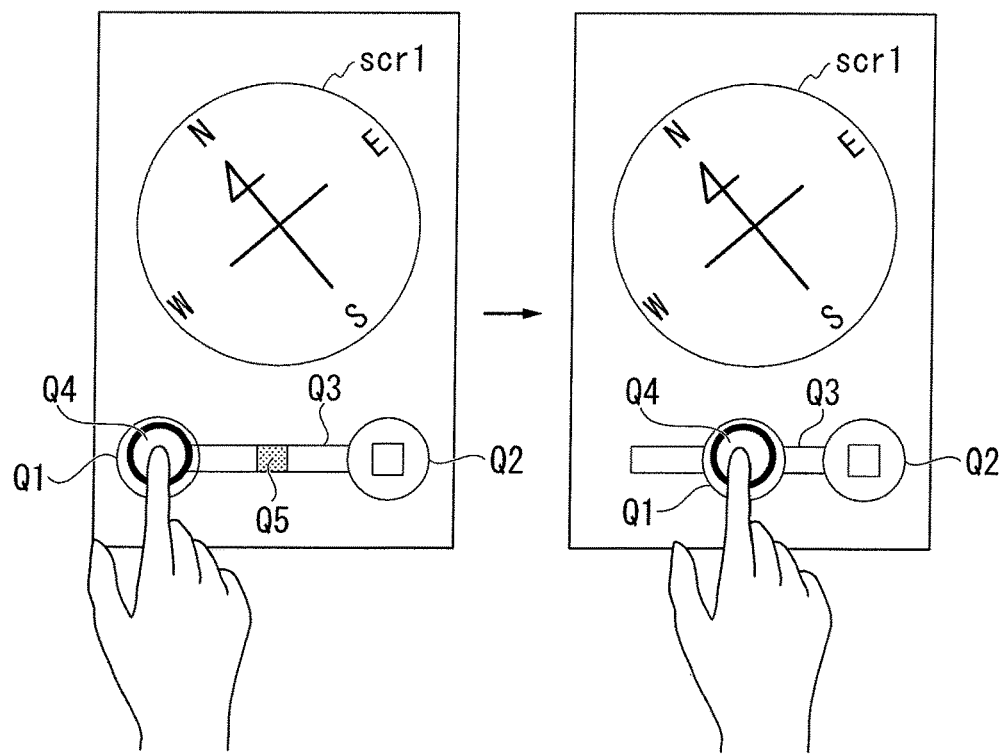
FIG. 13 includes enlarged front views showing a sequence of a slide operation to move an unlock icon with a user's finger on the lock screen shown in FIG. 12.

An example of a user's operation on the lock screen shown in FIG. 12 will be described with reference to FIG. 13. FIG. 13 shows an example of images which are displayed on the lock screen in response to a slide operation to move the unlock icon Q1. When a user touches the unlock icon Q1 with a finger on the lock screen, the round-type finger icon Q4 shown in FIG. 13(a) is displayed over the unlock icon Q1. Thereafter, a user moves a finger towards the display switching mark Q5 while continuously touching the surface of the touch panel 101, and then a user stops moving a finger as shown in FIG. 13(b).

Next, a user's operation subsequent to the slide operation using a finger shown in FIG. 13 will be described with reference to FIG. 14. When a user continuously touches the unlock icon Q1 for the predetermined time (i.e. the unlock decision time T1) or more without removing a finger from the surface of the touch panel 101 on the condition that a user has moved the unlock icon Q1 to the display switching mark Q5 with a finger, a display application switching process is executed such that the display application image on the lock screen is changed from the magnetic bearing image scr1 to the clock image scr2 as shown in FIG. 14(a). Additionally, when a user continuously touches the unlock icon Q1 for the predetermined time (i.e. the switch time T2) or more without removing a finger from the surface of the touch panel 101, a display application switching process is executed such that the display application image on the lock screen is changed from the clock image scr2 to the calendar image scr3 as shown in FIG. 14(b). Thereafter, when a user removes a finger from the surface of the touch panel 101, the portable terminal 11 accepts a user's operation to define the calendar image scr3 as the display application image. Thus, even when a user removes a finger from the surface of the touch panel 101, the calendar image scr3 is displayed as the display application image on the lock screen as shown in FIG. 14(c). At this time, the unlock icon Q1 is returned to the second display area R2.

Figure 15:
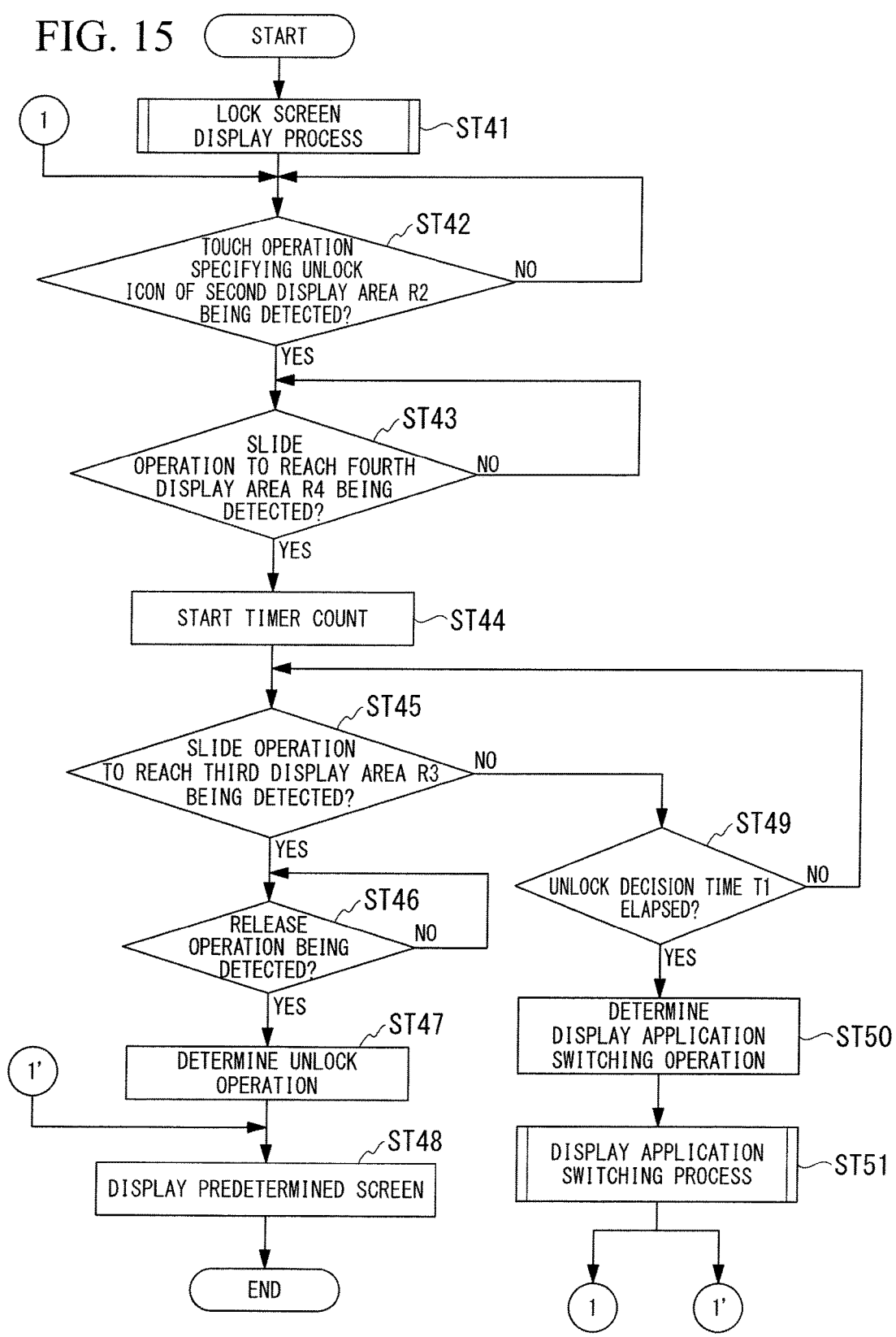
FIG. 15 is a flowchart showing a basic process of the portable terminal according to the second embodiment of the present invention.
Figure 16:
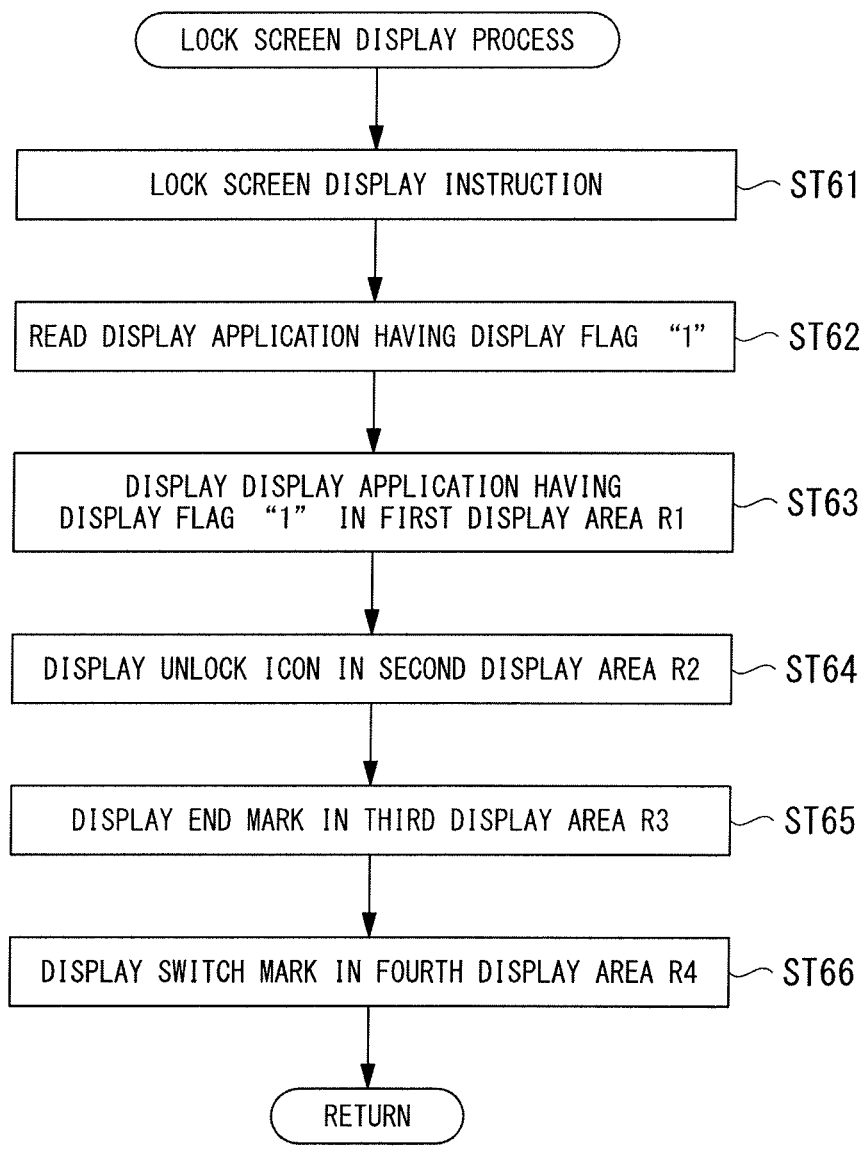
FIG. 16 is a flowchart showing a lock screen display process of the portable terminal according to the second embodiment of the present invention.

Next, the processing of the portable terminal 11 of the second embodiment will be described in detail with reference to FIGS. 15 and 16. First, the basic process of the portable terminal 11 will be described with reference to FIG. 15.
(Step ST41)

First, the portable terminal 11 executes a lock screen display process so as to display the lock screen shown in FIG. 12 on the display 112. That is, the display 112 displays the magnetic bearing image scr1 of the magnetic bearing application app1, which is determined as the display application image via the initial setting on the lock screen in advance, in the first display area R1. Additionally, the display 112 displays the unlock icon Q1 in the second display area R2, the end mark Q2 in the third display area R3, the slide bar Q3 and the display switching mark Q5 in the fourth display area R4.
(Step ST42)

The operation content determination part 121 determines as to whether or not a user's touch operation applied to the unlock icon Q1 in the second display area R2 is detected based on the output of the operation part 111. The operation content determination part 121 repeats the decision of step ST42 until a user's touch operation applied to the unlock icon Q1 is detected.
(Step ST43)

Upon detecting a user's touch operation on the unlock icon Q1, the operation content determination part 121 determines as to whether or not a slide operation, in which a user moves the unlock icon Q1 towards the display switching mark Q5 in the fourth display area R4 while touching it with a finger, is detected based on the output of the operation part 111. The operation content determination part 121 repeats the decision of step ST43 until it detects a slide operation to move the unlock icon Q1 towards the display switching mark Q5 after detecting a user's touch operation on the unlock icon Q1.

(Step ST44)

Upon detecting a user's slide operation to move the unlock icon Q1 towards the display switching mark Q5, the operation content determination part 121 counts the elapsed time after detecting a user's slide operation based on the time clocked by the timer 106. The elapsed time is counted up and then written into the temporary store area 132 as the timer information by means of the controller 102.

(Step ST45)

Next, the operation content determination part 121 determines as to whether or not a slide operation, in which a user moves the unlock icon Q1 towards the end mark Q2 in the third display area R3 while maintaining a touch operation on the unlock icon Q1, is detected based on the output of the operation part 111.

(Step ST46)

The operation content determination part 121 determines as to whether or not a user carries out an unlocking operation after detecting a slide operation in which a user moves the unlock icon Q1 towards the end mark Q2 in the third display area R3 while maintaining a touch operation on the unlock icon Q1. The operation content determination part 121 determines as to whether or not a user releases a touch operation on the unlock icon Q1. Specifically, after detecting a user's slide operation to move the unlock icon Q1 to the end mark Q2, the operation content determination part 121 determines as to whether or not a user removes a finger from the surface of the touch panel 101 based on the output of the operation part 111.

(Step ST47)

When a user removes a finger from the surface of the touch panel 101, the operation content determination part 121 determines that a user carries out an unlocking operation.

(Step ST48)

When a user carries out an unlocking operation, the display control part 122 displays the predetermined screen on the display part 112 in the unlocked state with reference to the store part 102. The display control part 122 displays the home screen or the menu screen on the display 112. Thereafter, the controller 102 is placed in the unlocked state.

(Step ST49)

In step ST45, when the unlock icon Q1 subjected to a user's touch operation is not moved to the end mark Q2 in the third display area R3, i.e. when it is determined that a user does not releases a touch operation on the unlock icon Q1, the operation content determination part 121 determines as to whether or not the unlock decision time T1 has elapsed from the time of detecting a user's slide operation. The flow returns to step ST45 when the operation content determination part 121 determines that the unlock decision time T1 has not elapsed.

(Step ST50)

In step ST49, at the time (t003) when it is determined that the unlock decision time T1 has elapsed from the time (t001) of detecting a user's slide operation, the operation content determination part 121 determines that a display application switching operation, instructing a change of a display application image displayed on the lock screen, is carried out.

(Step ST51)

The display control part 122 executes a display application switching process. Thus, the display application image displayed on the lock screen is changed from the magnetic bearing image scr1 of the magnetic bearing application app1 via the initial setting to other images such as the display applications app2 and app3. After executing the display application switching process in step ST51, it is possible to return the flow to step ST45 so as to continue processing in the locked state. Alternatively, it is possible to move the flow to step ST48 so as to release the locked state.

Next, the lock screen display process of the portable terminal 11 will be described with reference to FIG. 16.

(Step ST61)

The portable terminal 11 accepts an instruction to display the lock screen via the operation part 111. For example, when a power switch is operated in the standby state during the power saving mode, the operation content determination part 121 determines to accept an instruction to display the lock screen. The operation content determination part 121 outputs the information, representing the acceptance of an instruction to display the lock screen, to the display control part 122.

(Step ST62)

Next, the display control part 122 searches for a display application having a display flag "1" with reference to the display application starting information 134 of the store part 103. In FIG. 3, a display flag "1" is set to the application ID "A001" of the magnetic bearing application app1. For this reason, the display control part 122 starts the magnetic bearing application app1.

(Step ST63)

The display control part 122 displays the magnetic bearing image scr1 of the magnetic bearing application app1 in the first display area R1 of the display 112. The registration part 123 rewrites the flag information of the temporary store area 132. The registration part 123 writes the information representing the lately started display application. That is, the registration part 123 writes the application ID "A001" of the magnetic bearing application app1 as the flag information.

(Step ST64)

The display control part 122 displays the unlock icon Q1 in the second display area R2.

(Step ST65)

The display control part 122 displays the end mark Q2 in the third display area R3.

(Step ST66)

The display control part 122 displays the slide bar Q3 and the display switching mark Q5 in the fourth display area R4.

Thus, the display control part 122 executes the lock screen display process, and therefore the display 112 displays the magnetic bearing image scr1 of the magnetic bearing application app1 via the initial setting in the first display area R1 on the lock screen while displaying the unlock icon Q1 in the second display area R2, the end mark Q2 in the third display area R3, the slide bar Q3 and the display switching mark Q5 in the fourth display area R4.

Figure 17:
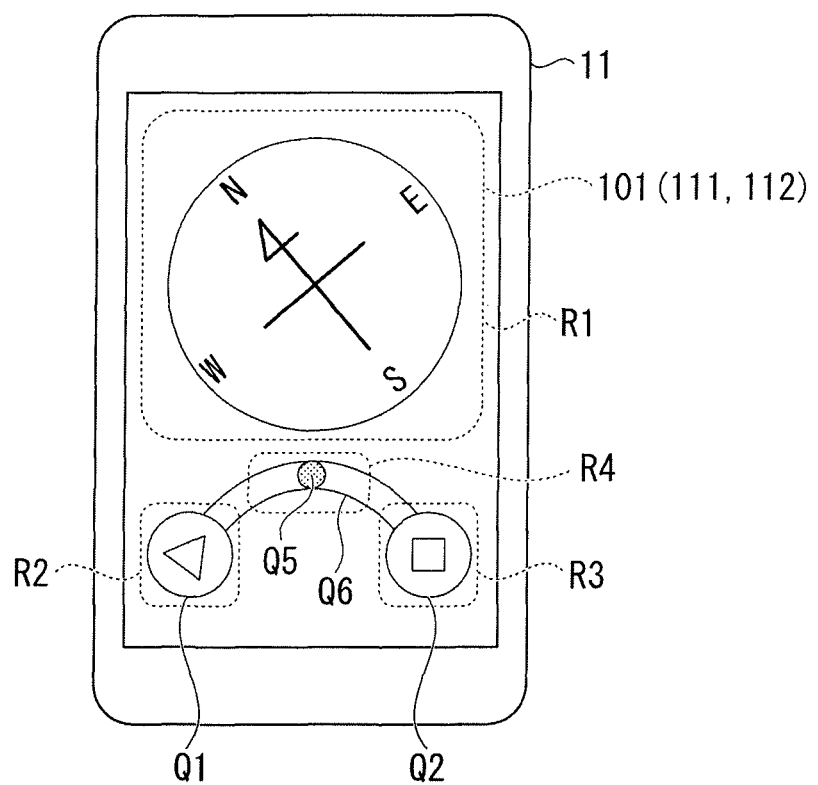
FIG. 17 is an enlarged front view showing a lock screen of the portable terminal according to a variation of the second embodiment of the present invention.

The portable terminal 11 of the second embodiment is not necessarily limited to the foregoing processing. For example, it is possible to display the lock screen shown in FIG. 17. As shown in FIG. 17, the portable terminal 11 displays the lock screen, including the first display area R1, the second display area R2, the third display area R3, and the fourth display area R4, on the display 112. In the locked state, the operation content determination part 121 accepts user's operations applied to the second display area R2, the third display area R3, and the fourth display area R4. The fourth display area R4 is used to display a slide bar Q6 along which the unlock icon Q1 is moved. The slide bar Q6 has an arch-like shape in which one end is connected to the second display area R2 (i.e. the unlock icon Q1) while the other end is connected to the third display area R3 (i.e. the end mark Q2). In the slide bar Q6, the top position closest to the first display area R1 is disposed at the intermediate position between the second display area R2 and the third display area R3, wherein the display switching mark Q5 is displayed at the top position. Owing to the arch-like shape of the slide bar Q6, it is possible to present the unlock icon Q1 from being overpassed to the end mark Q3 against user's intention during a user's slide operation on the unlock icon Q1.

Thus, the portable terminal 11 according to a variation of the second embodiment may switch over the contents of display applications depending on the time length of a touch operation when a user's touch operation on the unlock icon Q1 is maintained at the intermediate position between the second display area R2 and the third display area (i.e. the end mark Q2). A user may carry out a move operation to move the unlock icon Q1 to the fourth display area Q4, which is placed at the intermediate position between the second display area R2 and the third display area R3, and then maintains the position of the unlock icon Q1 for the predetermined time; hence, it is possible for each user to easily switch over display application images displayed on the lock screen. By using a different operation resembling an unlocking operation as a display application switching operation, it is possible to directly maintain the display areas used for an unlocking operation, and therefore it is possible to limit the display areas making the above operation effective, thus preventing user's erroneous operations. Additionally, a user does not need to remember operations of different systems since a display application switching operation resembles an unlocking operation.

When a user maintains a touch operation on the unlock icon Q1 at the intermediate position of the slide bar Q6 apart from the second display area R2, the portable terminal 11 of the second embodiment switches over the contents of display applications displayed on the display 112 in response to the time length of the touch operation. When a user carries out a move operation to move the unlock icon Q1 to the curved area (i.e. the fourth display area R4) between the second display area R2 and the third display area R3 and then maintains the position of the unlock icon Q1 for the predetermined time, it is possible to easily switch over the contents of display applications displayed on the lock screen. As described above, owing to a display application switching operation which is a different operation resembling an unlocking operation, it is possible to directly use the display areas used for an unlocking operation, and therefore it is possible to limit the display areas making the above operation effective, thus preventing user's erroneous operations. Additionally, a user does not need to remember operations of different systems since a display application switching operation resembles an unlocking operation. Moreover, a user may carry out a display application switching operation at the curved area of the slide bar Q6 which may serve as a mark for each user.

Third Embodiment

Next, the processing of a portable terminal 12 according to the third embodiment of the present invention will be described with reference to FIGS. 18 and 19. The portable terminal 12 has the same configuration as the portable terminal 1 of the first embodiment. Similar to the portable terminal 1, the portable terminal 12 displays the lock screen on the display 112 by executing the lock screen display process. The portable terminal 12 is not designed to switch over display application images in accordance with a display application switching process but to change the types of display application images.

Figure 18:
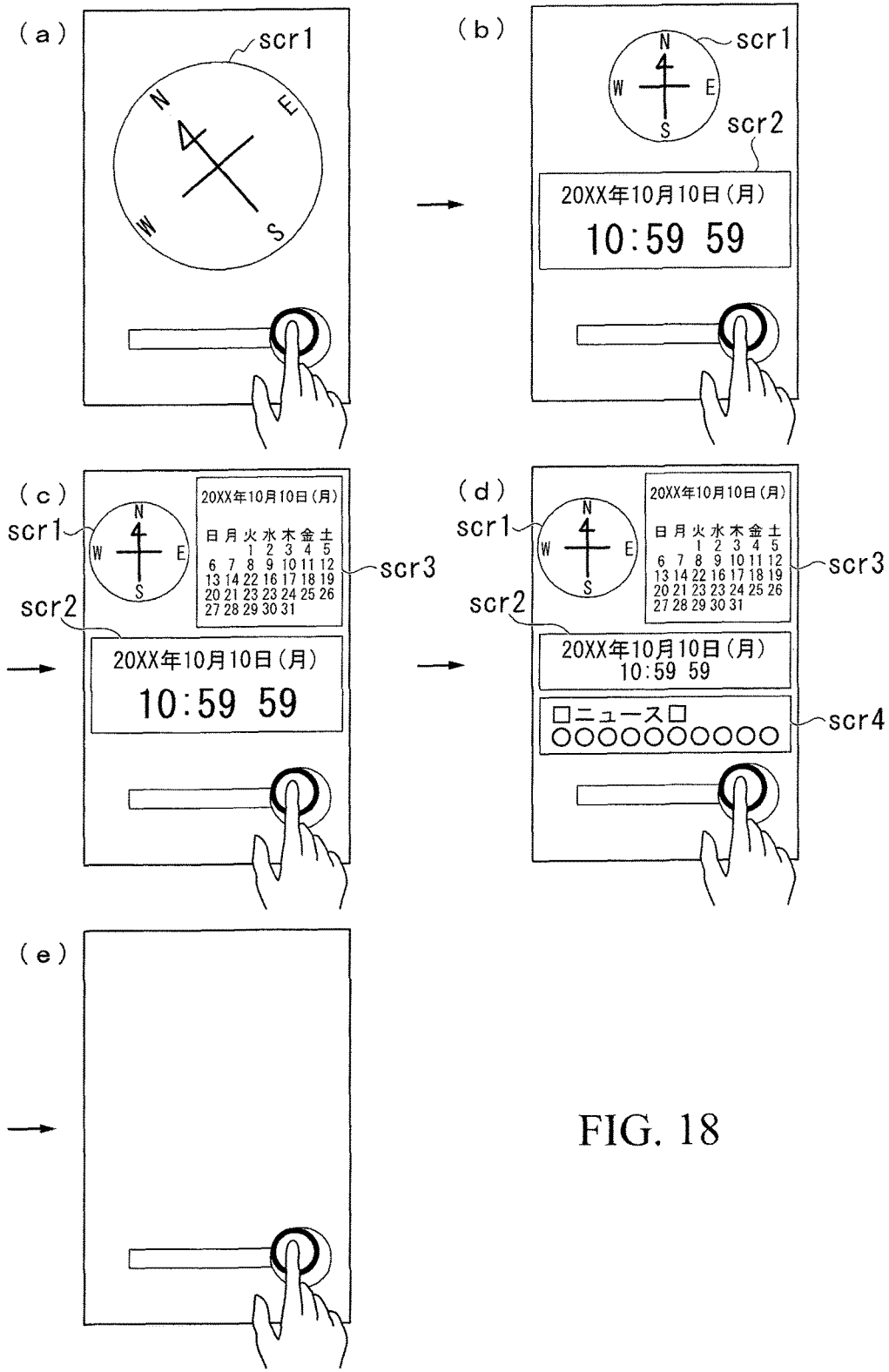
FIG. 18 includes enlarged front view showing a process subsequent to a user's slide operation on a portable terminal according to the third embodiment of the present invention.
Figure 19:
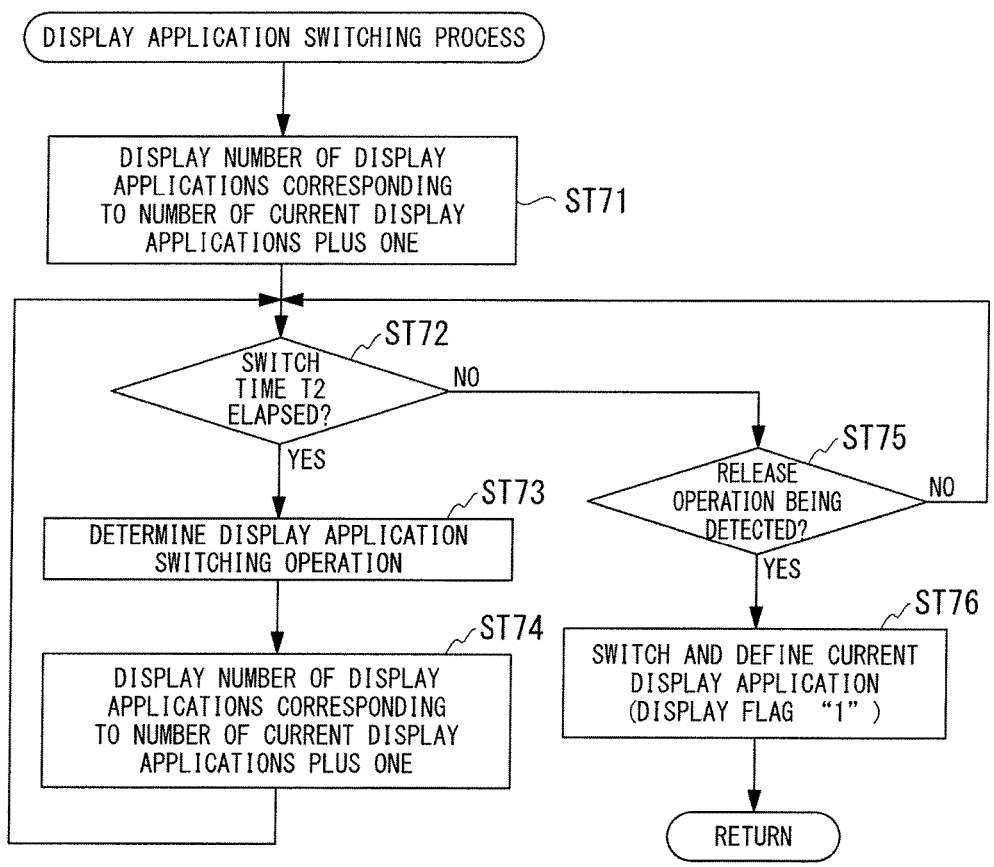
FIG. 19 is a flowchart showing a display application switching process of the portable terminal according to the third embodiment of the present invention.

Upon executing the lock display process, as shown in FIG. 18, the display control part 122 displays the magnetic bearing image scr1 via the initial setting on the display 112 as shown in FIG. 4. When a user carries out a touch operation on the second display area R2 with a finger, the operation content determination part 121 detects the touch operation. Next, the operation content determination part 121 detects a slide operation when a user carries out a move operation on the unlock icon Q1 subjected to the touch operation. The operation content determination part 121 determines as to whether or not a user's slide operation intends for an unlocking operation. As shown in FIG. 18(a), after a user carries out a slide operation to move the unlock icon Q1 to the end mark Q2, the operation content determination part 121 determines as to whether or not the predetermined time (i.e. the unlock decision time T1) or more has elapsed after a user's touch operation on the unlock icon Q1. When a user continues a touch operation at time (t003) at which the unlock decision time T1 has elapsed from the time (t001) of detecting a user's slide operation, i.e. when it is determined that a user does not release a touch operation within the unlock decision time T1, the display control part 122 executes a display application switching process at the elapsed time (t003) of the unlock decision time T1. Thus, as shown in FIG. 18(b), the display control part 122 switches over display application images on the lock screen from only the magnetic bearing image scr1 to a pair of the magnetic bearing image scr1 and the clock image scr2.

Next, the operation content determination part 121 determines as to whether or not the predetermined time (i.e. the switch time T2) or more has elapsed after a user's touch operation on the unlock icon Q1. Even when a user continues a touch operation at the time (t004) at which the switch time T2 has elapsed after the execution time (t003) of a display application switching process, i.e. when it is determined that a user does not release a touch operation within the switch time T2, the display control part 122 executes a display application switching process again at the time (t004) at which the switch time T2 has elapsed. Thus, as shown in FIG. 18(c), the display control part 122 switches over display application images on the lock screen from a pair of the magnetic bearing image scr1 and the clock image scr2 to a combination of the magnetic bearing image scr1, the clock image scr2, and the calendar image scr3.

The operation content determination part 121 determines as to whether or not the predetermined time (i.e. the switch time T2) or more has elapsed after a user's touching state of the unlock clock Q1. When a user continues a touch operation after the switch time T2 has elapsed from the time of switching the previous display application image, i.e. when it is determined that a user does not release a touch operation within the switch time T2, the display control part 122 executes a display application switching process again after the lapse of the switch time T2. Thus, as shown in FIG. 18(d), the display control part 122 switches over display application images on the lock screen from a combination of the magnetic bearing image scr1, the clock image scr2, and the calendar image scr3 to a combination of the magnetic bearing image scr1, the clock image scr2, the calendar image scr3, and the news image scr4.

Additionally, the operation content determination part 121 determines as to whether or not the predetermined time (i.e. the switch time T2) or more has elapsed after a user's touching state of the unlock icon Q1. When a user continues a touch operation after the switch time T2 has elapsed from the previous display application switching operation, i.e.

when it is determined that a user does not release a touch operation within the switch time T2, the display control part 122 executes a display application switching process again after the lapse of the switch time T2. Thus, as shown in FIG. 18(*e*), the display control part 122 may stop displaying a combination of the magnetic bearing image scr1, the clock image scr2, the calendar image scr3, and the news image scr4 as display application images on the lock screen, thus displaying on images on the lock screen.

In order to switch over display application images after the number of display applications on the screen of the portable terminal 12 becomes larger than a maximum display application count th1 which is determined in advance as the maximum number of display application images which can be displayed on the screen, the display control part 122 may reset the number of display application images to "0" so as to display no images on the display 112. The maximum display application count th1 is determined in advance based on the size of each display application image and the size of the screen area used to display the display application images.

Next, a display application switching process of the portable terminal 12 will be described with reference to FIG. 19. In this connection, the portable terminal 12 is able to execute the basic process shown in FIG. 8 and the lock screen display process shown in FIG. 9. For this reason, the following description does not refer to the processes other than the display application switching process of FIG. 19 in the portable terminal 12.

(Step ST71)

In the portable terminal 12, when the operation content determination part 121 determines that a user designates a display application switching process (e.g. step ST9 in FIG. 8), the display control part 122 increases a parameter m=1 representing the type of a display application image currently displayed on the display 112. That is, the display control part 122 sets the parameter m=1+1=2 representing the type of a display application image, thus storing it in the temporary store area 132.

The display control part 122 searches for a display application which is stored as the flag information with reference to the temporary store area 132. In step S23 of FIG. 9, the application ID "A001" of the magnetic bearing application app1 is written as the flag information in the temporary store area 132. The display control part 122 starts other display applications by the number of the parameter m=2, representing the type of the display application image, within the display application images written in the temporary store area 132. For example, the display control part 122 additionally starts the clock application app2, which is placed next to the magnetic bearing application app1 having the application ID "A001", with reference to the display application starting information 134. Herein, the magnetic bearing application app1 is started as well.

The display control part 122 displays the clock image scr2 of the clock application app2 in the first display area R1 of the display 112 in addition to the magnetic bearing image scr1 of the magnetic bearing application app1. The display contents of the second display area R2 and the third display area R3 are not changed. That is, the display part 112 displays a pair of the magnetic bearing image scr1 of the magnetic bearing application app1 and the clock image scr2 of the clock application app2 in the first display area R1 while displaying the unlock icon Q1 in the second display area R2 and the end mark Q3 in the third display area R3. The registration part 123 rewrites the flag information in the temporary store area 132. The registration part 123 writes the information of the lately started clock application app2 as the flag information. That is, the registration part 123 writes the application ID "A002" of the clock application app2 as the flag information. In this connection, the registration part 123 writes the flag information, representing the application IDs "A001" and "A002", in the temporary store area 132 without overwriting the application ID "A001" of the magnetic bearing application app1 which was already written as the flag information.

(Step ST72)

The operation content determination part 121 determines as to whether or not the switch time T2 has elapsed from the time of switching over display application images in the locked state.

(Step ST73)

Upon detecting the lapse of the switch time T2 in the locked state, the operation content determination part 121 determines that a user carries out a display application switching operation to instruct a change of a display application image on the lock screen.

(Step ST74)

Upon determining a user's display application switching operation, the display control part 122 searches for a display application stored as flag information with reference to the temporary store area 132 of the store part 103. Additionally, the display control part 122 determines as to whether or not the number of application IDs of display applications which are stored as flag information is less than the maximum display application count th1="4".

In step ST71, the flag information is rewritten in the temporary store area 132 such that a pair of the application ID "A001" of the magnetic bearing application app1 and the application ID "A002" of the clock application app2 is stored as the flag information. That is, the display control part 122 increases the number of display applications since "2" representing the number of the application IDs of the display applications which are currently stored as the flag information is less than the maximum display application count th1="4". Then, the display control part 122 starts the calendar application app3, which is placed next to the application ID "A002" of the clock application app2, with reference to the display application starting information 134. Herein, the magnetic bearing application app1 and the clock application app2 are started as well.

The display control part 122 displays the calendar image scr3 of the calendar application app3 in the first display area R1 of the display 112 in addition to the magnetic bearing image scr1 of the magnetic bearing application app1 and the clock image scr2 of the clock application app2. Herein, the display contents of the second display area R2 and the third display area R3 are not changed. That is, the display part 112 displays a combination of the magnetic bearing image scr1 of the magnetic bearing application app1, the clock image scr2 of the clock application app2, ad the calendar image scr3 of the calendar application app3 in the first display area R1 while displaying the unlock icon Q1 in the second display area R2 and the end mark Q2 in the third display area R3.

Thereafter, the registration part 123 rewrites the flag information in the temporary store area 132. The registration part 123 writes the information of the lately started display application as the flag information. That is, the registration part 123 writes the application ID "A003" of the calendar application app3 as the flag information. In this connection, the registration part 123 writes the application IDs "A001", "A002", and "A003" in the temporary store area 132 as the flag information without overwriting the flag information which was already written.

Thereafter, the flow returns to step ST72 so as to determine as to whether or not the switch time T2 has elapsed from the time of switching over display application images in the locked state. Upon detecting the lapse of the switch time T2 in the lock screen, the operation content determination part 121 determines that a user carries out a display application switching operation to instruct a change of a display application image which is displayed on the lock screen. Upon detecting a user's display application switching operation, the display control part 122 searches for a display application stored as flag information with reference to the temporary store area 132 of the store part 103. Additionally, the display control part 122 determines as to whether or not the number of application IDs of display applications which are stored as flag information is less than the maximum display application count th1="4".

As described above, the flag information of the temporary store area 132 is rewritten such that the application ID "A001" of the magnetic bearing application app1, the application ID "A002" of the clock application app2, the application ID "A003" of the calendar application app3 are stored as the flag information. That is, the display control part 122 increases the number of display applications since "3" representing the number of application IDs of display applications which are stored as the flag information is less than the maximum display application count th1="4". The display control part 122 searches and starts the news application app4, which is placed next to the calendar application app3 having the application ID "A003" with reference to the display application starting information 134. Herein, the magnetic bearing application app1, the clock application app2, and the calendar application app3 are started as well.

The display control part 122 displays the news image scr4 of the newly started news application app4 in the first display area R1 in addition to the magnetic bearing image scr1 of the magnetic bearing application app1, the clock image scr2 of the clock application app2, and the calendar image scr3 of the calendar application app3. Herein, the display contents of the second display area R2 and the third display area R3 are not changed. That is, the display part 112 displays a combination of the magnetic bearing image scr1 of the magnetic bearing application app1, the clock image scr2 of the clock application app2, the calendar image scr3 of the calendar application app3, and the news image scr4 of the news application app4 in the first display area R1 while displaying the unlock icon Q1 in the second display area R2 and the end mark Q2 in the third display area R3.

Thereafter, the registration part 123 rewrites the flag information in the temporary store area 132. The registration part 123 writes the information of the lately started display application as the flag information. That is, the registration part 123 writes the application ID "A004" of the news application app4 as the flag information. In this connection, the registration part 123 writes the application IDs "A001", "A002", "A003", "A004" in the temporary store area 132 as the flag information without overwriting the flag information which was already written.

The flow returns to step ST72, and therefore the operation content determination part 121 determines as to whether or not the switch time T2 has elapsed after the time of switching over display application images on the lock screen. Upon detecting the lapse of the switch time T2 in the lock screen, the operation content determination part 121 that a user carries out a display application switching operation to instruct a change of a display application displayed on the lock screen. Upon detecting a user's display application switching process, the display control part 122 searches for a display application stored as the flag information with reference to the temporary store area 132 of the store part 103. The display control part 122 determines as to whether or not the number of application IDs of display applications which are stored as flag information is less than the maximum display application count th1="4".

As described above, the flag information of the temporary store area 132 is rewritten such that the application ID "A001" of the magnetic bearing application app1, the application ID "A002" of the clock application app2, and the application ID "A003" of the calendar application app3, and the application ID "A004" of the news application app4 are stored as the flag information. The display control part 122 resets the number of display applications to zero since "4" representing the number of application IDs of display applications which are stored as the flag information is equal to the maximum display application count th1="4".

For this reason, the display control part 122 displays no images in the first display area R1 of the display 112. Herein, the display contents of the second display area R2 and the third display area R3 are not changed. That is, the display control part 122 does not display any images in the first display area R1 but displays the unlock icon Q1 in the second display area R2 and the end mark Q2 in the third display area R3. Thereafter, the registration part 123 erases the flag information in the temporary store area 132. Since no application IDs are stored in the temporary store area 132 as flag information, the display control part 122 searches a display application having a display flag "1" so as to display its image with reference to the display application starting information 134.

(Step ST75)

In step ST72, the operation content determination part 121 determines as to whether or not a user releases a touch operation on the unlock icon Q1 on the condition that the switch time T2 has not elapsed from the time of switching over display application images via a display application switching process. The operation content determination part 121 determines as to whether or not a user's finger is removed from the surface of the touch panel 101 before the switch time T2 elapses from the time of switching over display application images due to execution of a display application switching process.

(Step ST76)

When a user's finger is removed from the surface of the touch panel 101 before the switch time T2 elapses from the time of switching over display application images via a display application switching process, the operation content determination part 121 detects the release of a user's operation so as to exit the display application switching process. That is, the operation content determination part 121 determines to accept a user's instruction to define a display application image so as to terminate an operation to switch over display application images displayed on the lock screen, thus defining the image which is currently displayed on the display 112 as the display application image displayed on the lock screen. The registration part 123 changes the display flag assigned to the application ID of the display application from "1" to "0" in the display application starting information 134. Additionally, the registration part 123 rewrites the display flag assigned to the application ID of the display application stored as flag information in the temporary store part 132 with "1".

That is, the registration part 123 rewrites the display flag of the application ID "A001" of the magnetic bearing application app1 from "1" to "0" in the display application starting information 134. Additionally, the registration part 123 rewrites the display flag of the application ID "A003" of the calendar application app3, which is stored in the temporary store area 132 as flag information, with "1". Moreover, the registration part 123 rewrites the flag information of the temporary store area 132. The registration part 123 writes the application ID of the lately started display application in the temporary store area 132 as the flag information.

Figure 20:
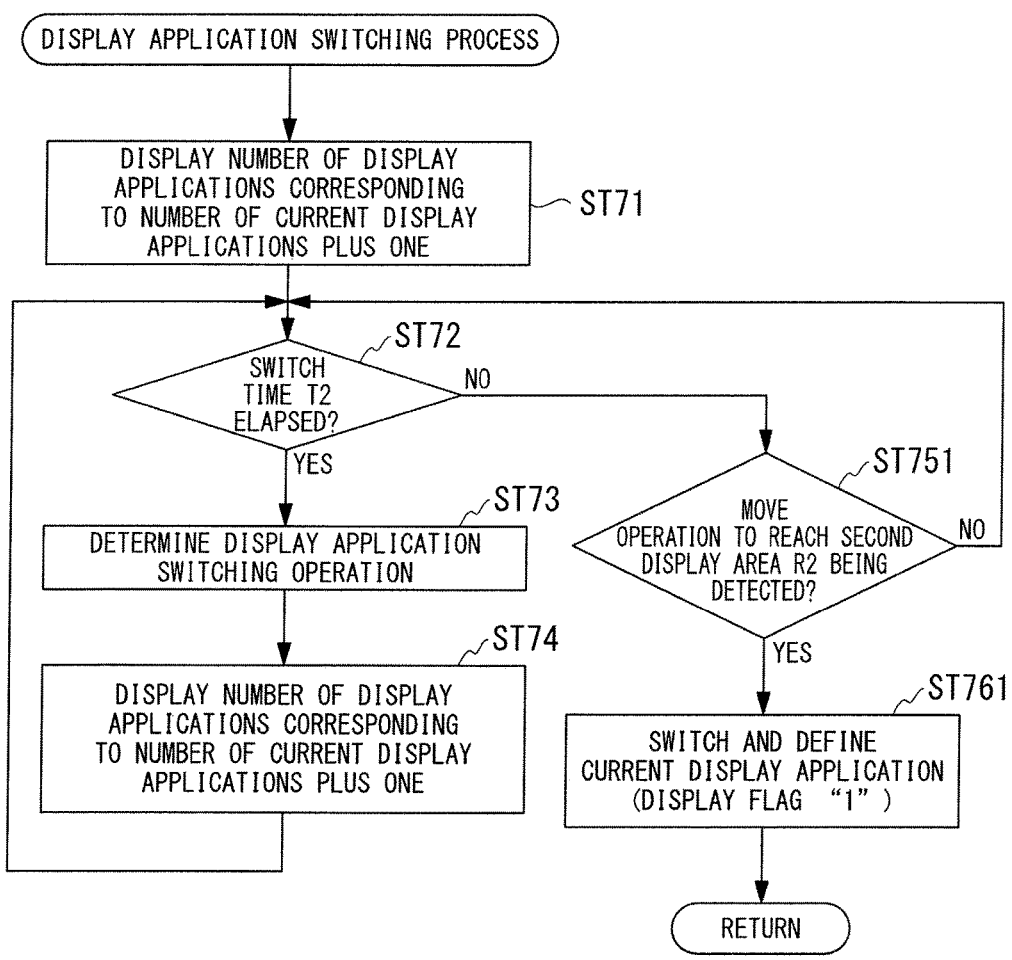
FIG. 20 is a flowchart showing a display application switching process of a portable terminal according to a variation of the third embodiment of the present invention.

The processing of the portable terminal 12 of the third embodiment is not necessarily limited to the above processing. For example, it is possible to modify the display application switching process of the portable terminal 12 as shown in FIG. 20. The display application switching process of FIG. 20 includes steps ST71 to ST74 of the display application switching process of FIG. 19, wherein steps ST751 and ST761 are substituted for steps ST75 and ST76. The descriptions regarding the foregoing steps ST71 to ST74 will be omitted below.

(Step ST751)

When the decision result of step ST72 is "NO", i.e. when it is determined that the switch time T2 has not elapsed from the time of switching over display application images via a display application switching process, the operation content determination part 121 determines as to whether or not a user carries out a move operation to move the unlock icon Q1 to the second display area R2 which is the initial position. To execute a display application switching process, the operation content determination part 121 determines whether or not to accept a user's move operation to return the unlock icon Q1 from the third display area R3 to the second display area R2 after a user's slide operation to move the unlock icon Q1 from the second display area R2 to the third display area R3.

(Step ST761)

When the unlock icon Q1 is returned to the second display area R2 from the third display area R3 before the switch time T2 elapses from the time of switching over display application images via a display application switching process, the operation content determination part 121 defines the display application image. That is, the operation content determination part 121 determines to accept a user's instruction to define the display application image so as to terminate the operation of switching over display application images displayed on the lock screen, thus defining the currently displayed image as the display application image displayed on the lock screen. Thereafter, the registration part 123 changes the display flag of the application ID of the display application from "1" to "0" in the display application starting information 134. Additionally, the registration part 123 rewrites the display flag of the application ID of the display application, which is stored in the temporary store area 132 as the flag information, with "1".

As described above, the foregoing portable terminal detects the release of a user's touch operation on the unlock icon Q1 so as to define a change of a display application displayed in the first display area R1. Thus, it is possible for each user to easily switch over display application images by releasing a touch operation on the unlock icon Q1 after a display application switching operation. The foregoing portable terminal defines a change of a display application image displayed in the first display area R1 when the unlock icon Q1 is returned to the initial position. It is possible for each user to reliably define a change of a display application image via a user's move operation to move the unlock icon Q1 to the second display area R2 after a display application switching operation. A user is able to clearly discriminate between an unlocking operation and an operation to define a change of a display application image since these operations differ from each other.

The foregoing portable terminal may release the locked state concurrently with defining a change of a display application image. Thus, it is possible for each user to implement a change of a display application image and a transition from the lock screen to the predetermined screen via a series of operations. The foregoing portable terminal can be redesigned not to release the locked state irrespective of an operation of defining a change of a display application image. Thus, it is possible for each user to switch over display application images without the transition from the lock screen to the predetermined screen. Moreover, the foregoing portable terminal is designed to change the types of display application images depending on the time length of a user's touch operation on the unlock icon Q1. Thus, it is possible for each user to easily change the types of display application images on the lock screen. The foregoing portable terminal is designed to change the number of display application images on the lock screen depending on the time length of a user's touch operation on the unlock icon Q1. Thus, it is possible for each user to easily change the number of display application images on the lock screen. The foregoing portable terminal is designed to change the types of display application images on the lock screen while changing the number of display application images, thus changing over a decision whether or not to display each display application image. Thus, it is possible for each user to easily change the display/non-display of each display application image on the lock screen.

In FIG. 2, the touch panel 101 includes the operation part 111 and the display 112; but this configuration is not restrictive. The display 112 can be modified into a display precluding a touch panel while the operation part 111 can be modified into an operation means such as a mouse, a keyboard, and a button.

The present invention relates to an information processing device incorporating a computer system whose processes and procedures are stored in computer-readable storage media as programs. Therefore, the computer system of an information processing device reads and executes programs from storage media so as to carry out the processing based on user's operations as described above. Herein, the computer system includes a CPU, various memory devices, and an OS (Operating system) as well as hardware components such as peripheral devices. Additionally, the computer system using a WWW system may embrace home page providing environments (or display environments).

Programs achieving the steps of the foregoing flowcharts can be stored in computer-readable storage media. By loading and executing programs realizing the foregoing block diagram and flowcharts, the computer system may calculate estimated values regarding the shape information of the detected objects (e.g. user's biological features or physical operating means). Computer-readable storage media refer to flexible disks, magneto-optical disks, ROM, rewritable non-volatile memory such as flash memory, portable media such as CD-ROM, and storage devices such as hard-disk units installed in computers.

Moreover, computer-readable storage media may encompass any devices which can retain programs for a specific time such as non-volatile memory (e.g. DRAM) installed in computer systems serving as servers or clients which receive programs transmitted thereto via telephone lines, communication lines, and networks such as the Internet. The foregoing programs stored in computer-readable storage media may be read from those media and transmitted via transmission media (or transmission waves in transmission media) to other computer systems. The "transmission media" used to transmit programs refer to media having functions to transmit information via telecommunication methods such as telephone lines, communication lines, and networks (or communication networks) such as the Internet. Additionally, it possible to use differential files (or differential programs), i.e. any measures which can realize the foregoing functions and procedures by being combined with programs pre-installed in computer systems.

INDUSTRIAL APPLICABILITY

The present invention is applied to information processing devices such as portable terminals and smart phones so as to smoothly carry out the processing interactively upon receiving a user's operations. In particular, small-size information processing devices having limited charging abilities employ lock screens in order to prevent power-down events, to achieve power saving modes used to maintain functions for a long time, and to prevent a users' erroneous operation in non-usage times of information processing devices. It is possible for each user to smoothly carry out a resume operation from the lock screen, and it is possible for each user to attach the user's preferred images on the display screen after releasing the lock screen. Thus, the present invention aims to provide user-friendly and interactive functions, to prevent security problems due to erroneous operations, and to provide effective measures in terms of energy saving and environmental factors; hence, the present invention is applicable to numerous electronic devices.

REFERENCE SIGNS LIST 1, 11, 12 portable terminal
101 touch panel
102 controller
103 store part
104 audio signal processor
105 radio communication part
106 timer
107 detector
111 operation part
112 display
121 operation content determination part
122 display control part
123 registration part
131 program store area
132 temporary store area
133 display information store area
171 position detection part
172 thermometer
R1 first display area
R2 second display area
R3 third display area
R4 fourth display area
Q1 unlock icon
Q2 end mark
Q3 slide bar
Q4 finger icon
Q5 display switching mark

The invention claimed is:

1. An information processing device having a touch panel comprising:
a display having a touch sensitivity and a lock screen configured to concurrently and separately display a main area to display a lock image, and an auxiliary area to display an unlock icon initially disposed at a first position in a locked state and moveable in a predetermined direction to a second position according to a user's operation;
an operation part configured to accept the user's operation using the unlock icon in the auxiliary area of the display;
a storage unit configured to store a plurality of application images implementing a plurality of applications that are listed in a predetermined order and from which an initial image is selected to be initially displayed as the lock image in advance;
a timer configured to count a first time, the first time counted from a start timing when the unlock icon is moved from the first position to the second position in the auxiliary area to when the unlock icon is released by the user's operation, and a second time following the first time, the second time counted from when the unlock icon is disposed at the second position to when the unlock icon is released by the user's operation; and
a controller configured to control the display according to the user's operation, wherein
the controller is configured to unlock the locked state if the user's operation comprises an unlock instruction and change the lock image from the initial image to a next image selected from among the plurality of application images if the user's operation comprises an application switching instruction, and the controller is further configured to:
(i) determine the unlock instruction and thereby define the initial image displayed in the main area when the unlock icon is released before the first time has elapsed from the start timing,
(ii) determine the application switching instruction to display the next image in the main area when the first time has elapsed from the start timing,
(iii) define the next image displayed in the main area when the unlock icon is released before the second time has elapsed after the first time, and
(iv) determine a secondary application switching instruction to change the next image to a further image selected from among the plurality of application images when the second time has elapsed from the first time.

2. The information processing device according to claim 1, further comprising:
an operation content determination part configured to determine the unlock instruction by detecting the unlock icon disposed at the predetermined position for the first time, to determine the application switching instruction by detecting the unlock icon continuously disposed at the predetermined position after the first time or to determine the secondary application switching instruction by detecting the unlock icon continuously disposed at the predetermined position for the second time after the first time.

3. The information processing device according to claim 2, wherein the operation content determination part determines the application switching instruction upon the user moving the unlock icon to the predetermined position interposed between an initial position and a final position for the unlock icon displayed in the auxiliary area of the display.

4. The information processing device according to claim 2, wherein the auxiliary area displays an initial position to initially dispose the unlock icon, a final position to move the unlock icon, and a pathway allowing for a sliding operation of the unlock icon from the initial position to the final position, and wherein the display control part automatically changes the initial image to the next image depending on a time length of the user's operation of the unlock icon for the second time following the first time at a moved position of the unlock icon along the pathway interposed between the initial position and the final position.

5. An information processing method adapted to an information processing device having a touch panel having a lock screen configured to concurrently and separately display a main area to display a lock image and an auxiliary area to display an unlock icon initially disposed at a first position in a locked state and moveable in a predetermined direction to a second position according to a user's operation, comprising:

displaying an initial image, which is selected from among a plurality of application images implementing a plurality of applications that are listed in a predetermined order, to be initially displayed as the lock image on the lock screen;

counting a first time, the first time counted from a start timing when the unlock icon is moved from the first position to the second position in the auxiliary area to when the unlock icon is released by the user's operation, and a second time following the first time, the second time counted from when the unlock icon is disposed at the second position to when the unlock icon is released by the user's operation; and determining whether the user's operation indicates either an unlock instruction to unlock the locked or an application switching instruction to change the lock image from the initial image to a next image selected from among the plurality of application images by:

(i) determining the unlock instruction and thereby defining the initial image displayed in the main area when the unlock icon is released before the first time elapsed from the start timing, (ii) determining the application switching instruction to display the next image in the main area when the first time has elapsed from the start timing, (iii) defining the next image displayed in the main area when the unlock icon is released before the second time has elapsed after the first time; and (iv) determining a secondary application switching instruction to further change the next image to a further image selected from among the plurality of application images when the second time has elapsed from the first time.

6. A non-transitory computer-readable storage medium implementing an information processing method according to claim 5.

7. The information processing device according to claim 1, wherein the first time is set to be longer than the second time in advance.

8. The information processing method according to claim 5, wherein the first time is set to be longer than the second time in advance.

9. The information processing device according to claim 1, wherein a plurality of images including the initial image are concurrently displayed in the main area within a maximum number of images depending on a size of the main area such that the next image is temporarily displayed in addition to the initial image in the main area in a period between the first time and the second time.

10. The information processing method according to claim 5, wherein a plurality of images including the initial image are concurrently displayed in the main area within a maximum number of images depending on a size of the main area such that upon determining the application switching instruction, the next image is temporarily displayed in addition to the initial image in the main area in a period between the first time and the second time.

11. The information processing device according to claim 9, wherein the next image and the further image are temporarily displayed in addition to the initial image in the main area upon determining the secondary application switching instruction.

12. The information processing method according to claim 10, wherein, upon determining the secondary switching instruction, the next image and the further image are temporarily displayed in addition to the initial image in the main area.

13. The information processing device according to claim 2, further comprising:

a display control part configured to unlock the locked state of the display according to the unlock instruction, to automatically change the initial image to the next image among the plurality of application images according to the application switching instruction, or to automatically change the next image to the further image according to the secondary application switching instruction.

* * * * *